United States Patent
Puthiyapurayil et al.

(10) Patent No.: US 11,645,611 B1
(45) Date of Patent: May 9, 2023

(54) SYSTEM AND METHOD OF DECODING SUPPLY CHAIN SIGNATURES

(71) Applicant: Blue Yonder Group, Inc., Scottsdale, AZ (US)

(72) Inventors: Rashid Puthiyapurayil, Bangalore (IN); Narayan Nandeda, Ujjain (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 17/133,010

(22) Filed: Dec. 23, 2020

Related U.S. Application Data

(60) Provisional application No. 62/952,848, filed on Dec. 23, 2019.

(51) Int. Cl.
| | | |
|---|---|---|
| *G06Q 10/08* | (2023.01) | |
| *G06Q 10/0835* | (2023.01) | |
| *G06Q 10/087* | (2023.01) | |
| *G06N 20/00* | (2019.01) | |

(52) U.S. Cl.
CPC ......... *G06Q 10/0835* (2013.01); *G06N 20/00* (2019.01); *G06Q 10/087* (2013.01)

(58) Field of Classification Search
CPC ... G06Q 10/0835; G06Q 10/087; G06N 20/00
See application file for complete search history.

(56) References Cited

U.S. PATENT DOCUMENTS

| | | | |
|---|---|---|---|
| 9,037,464 B1 | 5/2015 | Mikolov et al. | |
| 2016/0358024 A1* | 12/2016 | Krishnakumar | ............................ G06V 30/19127 |
| 2017/0344920 A1* | 11/2017 | Shenoy | ................ G06Q 10/087 |
| 2019/0087529 A1* | 3/2019 | Steingrimsson | ........ G06F 30/00 |
| 2021/0133322 A1* | 5/2021 | Healy | .................... G06V 10/82 |

* cited by examiner

*Primary Examiner* — Peter Ludwig
*Assistant Examiner* — Reva R Moore
(74) *Attorney, Agent, or Firm* — Spencer Fane LLP; Steven J. Laureanti

(57) ABSTRACT

A system and method for automated machine learning supply chain planning having a computer with a processor and memory and configured to receive a first supply chain network model having one or more material constraints for operations of a first supply chain network. Embodiments include transforming the first supply chain network model into a digital image, training an auto-encoder model to reduce the dimensionality of an input vector, and locating one or more items in the first supply chain network.

20 Claims, 11 Drawing Sheets

| encoded_imgs[2] | | | | | |
|---|---|---|---|---|---|
| array([ 0. | , 0. | , 0. | , 0. | , 0. | , |
| 0. | , 0. | , 0. | , 0. | , 0. | , |
| 0. | , 0. | , 4236.8516 | , 0. | , 0. | , |
| 9459.319 | , 0. | , 0. | , 0. | , 0. | , |
| 0. | , 0. | , 0. | , 0. | , 0. | , |
| 0. | , 0. | , 0. | , 0. | , 0. | , |
| 0. | , 0. | , 0. | , 0. | , 0. | , |
| 0. | , 0. | , 0. | , 0. | , 0. | , |
| 0. | , 0. | , 0. | , 0. | , 227.32828 | , |
| 0. | , 0. | , 0. | , 0. | , 0. | , |
| 0. | , 0. | , 0. | , 0. | , 553.17566 | , |
| 0. | , 0. | , 0. | , 0. | , 0. | , |
| 0. | , 0. | , 0. | , 0. | , 0. | , |
| 0. | , 0. | , 0. | , 0. | , 0. | , |
| 0. | , 0. | , 0. | , 0. | , 8937.882 | , |
| 0. | , 0. | , 0. | , 0. | , 0. | , |
| 0. | , 0. | , 0. | , 0. | , 0. | , |
| 0. | , 0. | , 0. | , 0. | , 0. | , |
| 0. | , 0. | , 0. | , 11570.721 | , 0. | ], |
| dtype=float32) | | | | | |

```
im1                                                    ┌─1302
array([[  0.,   0.,   0., ...,   0.,  26., 140.],
       [ 30., 239.,   0., ...,  95.,  76., 105.],
       [115., 116.,   0., ...,  93., 222., 127.],
       ...,
       [  1.,   7., 242., ...,   0.,   1.,   7.],
       [242., 182., 224., ...,   0.,   0.,   0.],
       [  0.,   0.,   0., ...,   0.,   0.,   0.]], dtype=float32)
im2                                                    ┌─1304
array([[  0.,   0.,   0., ...,   0.,  31., 153.],
       [ 35., 260.,   0., ..., 105.,  85., 116.],
       [127., 128.,   0., ..., 103., 242., 139.],
       ...,
       [  0.,   0.,  11., ...,   0.,   0., 277.],
       [104., 218.,  97., ...,   0.,   0.,   0.],
       [  0.,   0.,   0., ...,   0.,   0.,   0.]], dtype=float32)
```

FIG. 13

```
im1                                                    ┌─1402
array([[  0.,   0.,   0., ...,  83.,  67.,  80.],
       [ 95.,  69.,  78., ...,  67.,  80.,  95.],
       [ 69.,  78.,  71., ...,  14.,   0.,  91.],
       ...,
       [  0.,  88.,  68., ...,  88.,  87.,  68.],
       [  7.,   2.,   4., ...,   0.,   0.,   0.],
       [  0.,   0.,   0., ...,   0.,   0.,   0.]], dtype=float32)
im2                                                    ┌─1404
array([[  0.,   0.,   0., ...,  66.,  53.,  63.],
       [ 75.,  54.,  61., ...,  52.,  62.,  75.],
       [ 54.,  61.,  56., ...,   9.,   0.,  72.],
       ...,
       [  0.,  69.,  53., ...,  69.,  68.,  53.],
       [  0.,   0.,   0., ...,   0.,   0.,   0.],
       [  0.,   0.,   0., ...,   0.,   0.,   0.]], dtype=float32)
```

FIG. 14

SYSTEM AND METHOD OF DECODING SUPPLY CHAIN SIGNATURES

CROSS-REFERENCE TO RELATED APPLICATIONS

The present disclosure is related to that disclosed in the U.S. Provisional Application No. 62/952,848, filed Dec. 23, 2019, entitled "System and Method of Decoding Supply Chain Signatures." U.S. Provisional Application No. 62/952,848 is assigned to the assignee of the present application. The subject matter disclosed in U.S. Provisional Application No. 62/952,848 is hereby incorporated by reference into the present disclosure as if fully set forth herein. The present invention hereby claims priority under 35 U.S.C. § 119(e) to U.S. Provisional Application No. 62/952,848.

TECHNICAL FIELD

The present disclosure relates generally to supply chain planning and operation and specifically to decoding a supply chain signature of supply chain static or dynamic structure.

BACKGROUND

During supply chain planning, a supply chain plan may be generated by solving a supply chain planning problem modeled as a single- or multi-objective linear programming problem (LPP). For example, a supply chain planner may model a master production problem as a multi-objective hierarchical LPP. The supply chain planner may update and re-solve the supply chain planning problem from time-to-time when changes occur in the supply chain. However, even when there are few changes to the supply chain and these changes are known, re-solving the supply chain planning problem may take as much time to solve as the initial supply chain planning problem. This inefficiency to re-solve a previously-solved supply chain problem when there are only a few known changes to a supply chain is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 13 illustrates an array representing the input image of a supply chain network and an array representing the output image reconstructed from the signature by the auto-encoder system of FIG. 1, in accordance with an embodiment;

FIG. 14 illustrates an array representing the input image of a supply chain network and an array representing the output image for a second use case, in accordance with an embodiment.

DETAILED DESCRIPTION

Figure 1:
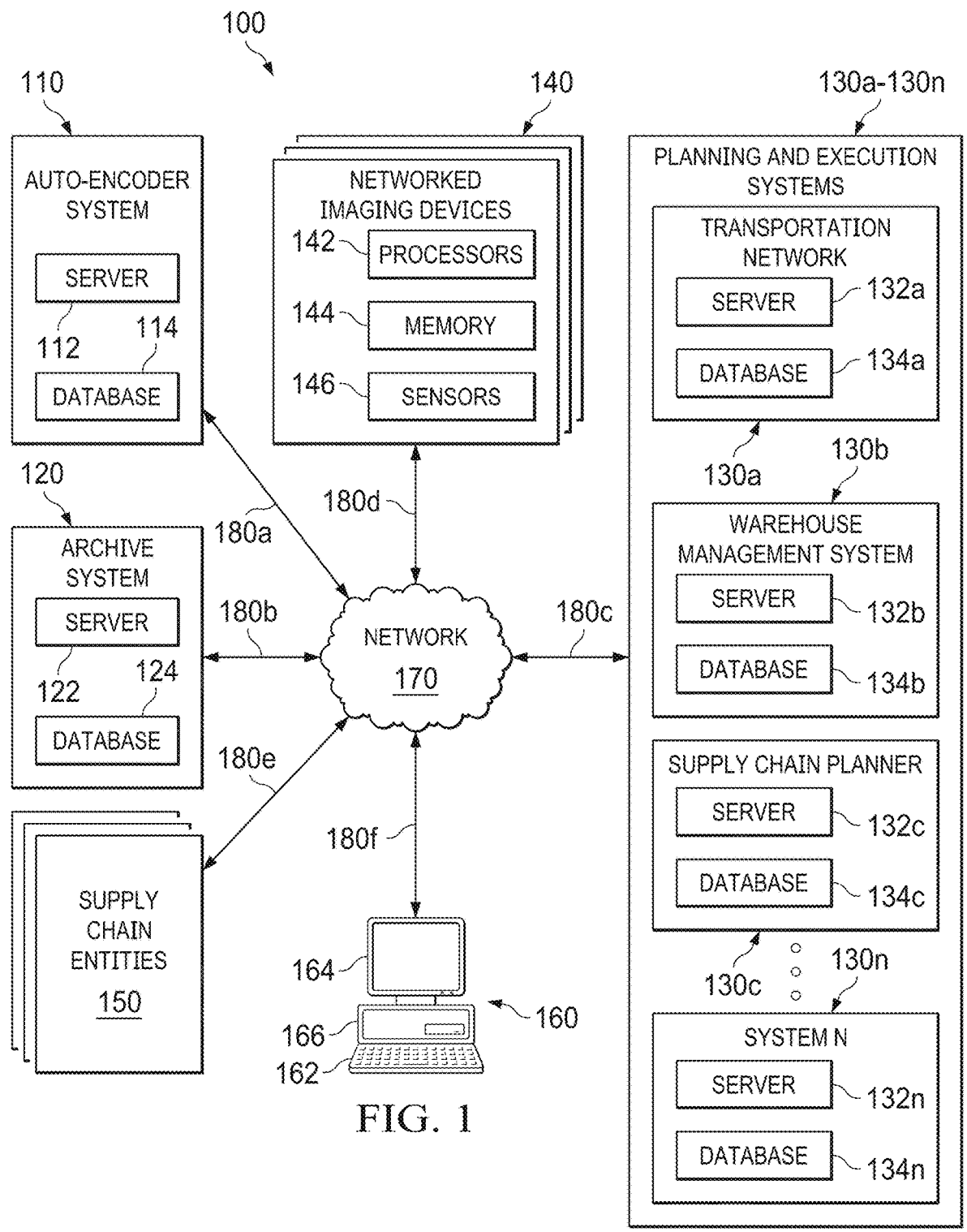
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates supply chain network 100, in accordance with a first embodiment. Supply chain network 100 comprises auto-encoder system 110, archive system 120, one or more planning and execution systems 130*a*-130*n*, one or more networked imaging devices 140, one or more supply chain entities 150, one or more computers 160, network 170, and communication links 180*a*-180*g*. Although a single auto-encoder system 110, a single archive system 120, one or more planning and execution systems 130*a*-130*n*, one or more networked imaging devices 140, one or more supply chain entities 150, one or more computers 160, and a single network 170 are shown and described, embodiments contemplate any number of auto-encoder systems, archive systems, planning and execution systems, networked imaging devices, supply chain entities, computers, or networks, according to particular needs.

In one embodiment, auto-encoder system 110 comprises server 112 and database 114. Server 112 comprises one or more modules that generate a condensed representation of a supply chain as a vector space model using an auto-encoder. As described in further detail below, auto-encoder system 110 transforms supply chain network models 210 (FIG. 2) into digital images and, further, uses the images to train auto-encoder model 206. Auto-encoder model 206 is an artificial neural network (ANN) that is trained to encode an input as a representation having a lower dimensionality and decode the lower-dimensionality representation into an output that replicates the input. During training of the auto-encoder model, this structure (input to representation to output) is exploited to train auto-encoder model 206 by comparing the input with the output and tuning auto-encoder model parameters 216 using back propagation of the error. In this case, the input is an image representing supply chain network models 210. When the input to auto-encoder model 206 converges to the output for a large number of training instances, the lower-dimensional representation uniquely encodes the input supply chain network model. As described in further detail below, the lower-dimensional representations, referred to as supply chain signatures 222, are unique vector space representations of supply chain network models. In addition, or as an alternative, auto-encoder system 110 generates supply chain signatures 222 of transportation routes to compare the similarity or dissimilarity of routes and/or locate routes transporting similar items, as described in further below. According to some embodiments, auto-encoder system 110 creates signatures 222 to locate items in stocking locations of one or more warehouses. Further embodiments of auto-encoder system 110 may measure similarity or dissimilarity between supply chain networks by transforming the supply chain into a vector space model where an inner product exists (e.g. a Hilbert space), and uses one or more comparison methods, as described in further detail below.

Archive system 120 of supply chain network 100 comprises server 122 and database 124. Although archive system 120 is shown as comprising a single server 122 and a single database 124, embodiments contemplate any suitable number of servers or databases internal to or externally coupled with archive system 120. Server 122 of archive system 120 may support one or more processes for receiving and storing data from one or more planning and execution systems 130a-130n, one or more networked imaging devices 140, one or more supply chain entities 150, and/or one or more computers 160 of supply chain network 100. According to some embodiments, archive system 120 comprises an archive of data received from one or more planning and execution systems 130a-130n, one or more networked imaging devices 140, one or more supply chain entities 150, and/or one or more computers 160 of supply chain network 100, and archive system 120 provides archived data to auto-encoder system 110, and one or more planning and execution systems 130a-130n to, for example, train auto-encoder model 206, generate supply chain signatures 222 that uniquely represent supply chain network models 210, train a machine learning model, and generate solver-less solutions to supply chain planning problems. Server 122 may store the received data in database 124. Database 124 of archive system 120 may comprise one or more databases or other data storage arrangement at one or more locations, local to, or remote from, server 124.

One or more planning and execution systems 130a-130n of supply chain network 100 comprise transportation network 130a, warehouse management system 130b, supply chain planner 130c, and any quantity of other planning and execution systems 130n. Although one or more planning and execution systems 130a-130n are shown and described as comprising a single transportation network 130a, a single warehouse management system 130b, a single supply chain planner 130c, and a single other planning and execution system 130n, embodiments contemplate any number or combination of one or more planning and execution systems 130a-130n located internal to, or remote from, supply chain network 100, according to particular needs. For example, one or more planning and execution systems 130a-130n typically perform several distinct and dissimilar processes, including, for example, assortment planning, demand planning, operations planning, production planning, supply planning, distribution planning, execution, forecasting, transportation management, warehouse management, inventory management, fulfilment, procurement, and the like. Servers 132a-132n of one or more planning and execution systems 130a-130n comprise one or more modules, such as, for example, planning modules, solvers, modelers, and/or one or more engines for performing activities of one or more planning and execution processes. In addition, servers 132a-132n store and retrieve data from databases 134a-134n or from one or more locations in supply chain network 100. In addition, one or more planning and execution systems 130a-130n operate on one or more computers 160 that are integral to, or separate from, the hardware and/or software that support auto-encoder system 110, archive system 120, one or more networked imaging devices 140, and/or one or more supply chain entities 140.

As disclosed above, one or more planning and execution systems 130a-130n may include transportation network 130a. As disclosed above and described in further detail below, one embodiment of auto-encoder system 110 creates a supply chain signature of transportation routes to compare the similarity or dissimilarity of routes and/or locate routes transporting similar items. Transportation network 130a comprises server 132a and database 134a. According to embodiments, transportation network 130a directs one or more transportation vehicles to ship one or more items between one or more supply chain entities 150, based, at least in part, a supply chain plan, including a supply chain master plan, the amount of items currently in stock at one or more supply chain entities 150 or other stocking location, the amount of items currently in transit in transportation network 130a, a forecasted demand, a supply chain disruption, and/or one or more other factors described herein. One or more transportation vehicles comprise, for example, any number of trucks, cars, vans, boats, airplanes, unmanned aerial vehicles (UAVs), cranes, robotic machinery, or the like. The one or more transportation vehicles may comprise radio, satellite, or other communication that communicates location information (such as, for example, geographic coordinates, distance from a location, global positioning satellite (GPS) information, or the like) with auto-encoder system 110, archive system 120, one or more planning and execution systems 130a-130n, one or more networked imaging devices 140, and/or one or more supply chain entities 150 to identify the location of the one or more transportation vehicles and the location of any inventory or shipment located on the one or more transportation vehicles.

By way of a further example only and not by way of limitation, one or more planning and execution systems 130a-130n include warehouse management system 130b. As disclosed above, auto-encoder system 110 creates a signature of warehouse items received from warehouse management system 130b and locate where similar items are placed in the warehouse. In one embodiment, warehouse management system 130b comprises server 132b and database 134b. According to embodiments, server 132b comprises one or more modules that manage and operate warehouse operations, plan timing and identity of shipments, generate picklists, packing plans, and instructions. Warehouse management system 130b instructs users and/or automated machinery to obtain picked items and generates instructions to guide placement of items on a picklist in the configuration and layout determined by a packing plan. For example, the instructions may instruct a user and/or automated machinery to prepare items on a picklist for shipment by obtaining the items from inventory or a staging area and packing the items on a pallet in a proper configuration for shipment. Embodiments contemplate warehouse management system 130b determining routing, packing, or placement of any item, package, or container into any packing area, including, packing any item, package, or container in another item, package, or container. Warehouse management system 130b may generate instructions for packing products into boxes, packing boxes onto pallets, packing loaded pallets into trucks, or placing any item, container, or package in a packing area, such as, for example, a box, a pallet, a shipping container, a transportation vehicle, a shelf, a designated location in a warehouse (such as a staging area), and the like.

In addition, or as an alternative to one or more planning and execution systems 130a-130n comprising warehouse management system 130b, embodiments contemplate one or more planning and execution systems 130a-130n comprising an inventory system. The inventory system comprises a server configured to receive and transmit item data, including item identifiers, pricing data, attribute data, inventory levels, and other like data about one or more items at one or more stocking locations in supply chain network 100. The server stores and retrieves item data from a database of the inventory system or from one or more locations in supply chain network 100.

As disclosed above, one or more planning and execution systems 130a-130n include supply chain planner 130c. Supply chain planner 130c solves supply chain planning problems (such as, for example, operation planning problems). Supply chain planner 130c accesses archived trained machine-learning models 276, which may be received from supply chain planner 130c. Using supply chain signatures 222 received from auto-encoder system 110, supply chain planner 130c uses a machine-learning model 244 to create an autonomous and self-learning supply chain solver. In addition, supply chain planner 130c may transmit supply chain data 262 to auto-encoder system 110, which uses the transmitted supply chain data 262 to create the supply chain signatures 222. Although auto-encoder system 110 is shown and described as receiving supply chain data 262 from a supply chain solver 284, embodiments contemplate auto-encoder system 110 using any type of supply chain planning or execution data as an input to create a supply chain signatures 222. In addition, although auto-encoder system 110 is described as receiving an input comprising the supply chain planning problem, auto-encoder system 110 may generate a signature of any supply chain data including, for example, supply chain network models (e.g. supply chain data models, supply chain object models, and the like) or any other supply chain data received from archiving system 120, any of one or more planning and execution systems 130a-130n, and/or one or more locations local to, or remote from supply chain network 100.

One or more networked imaging devices 140 comprise one or more processors 142, memory 144, one or more sensors 146, and may include any suitable input device, output device, fixed or removable computer-readable storage media, or the like. According to embodiments, one or more networked imaging devices 140 comprise an electronic device that receives imaging data from one or more sensors 146 or from one or more databases in supply chain network 100. One or more sensors 146 of one or more networked imaging devices 140 may comprise an imaging sensor, such as, a camera, scanner, electronic eye, photodiode, charged coupled device (CCD), or any other electronic component that detects visual characteristics (such as color, shape, size, fill level, or the like) of objects. One or more networked imaging devices 140 may comprise, for example, a mobile handheld electronic device such as, for example, a smartphone, a tablet computer, a wireless communication device, and/or one or more networked electronic devices configured to image items using one or more sensors 146 and transmit product images to one or more databases.

In addition, or as an alternative, one or more sensors 146 may comprise a radio receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like objects that encode identifying information. One or more networked imaging devices 140 may generate a mapping of one or more items in supply chain network 100 by scanning an identifier or object associated with an item and identifying the item based, at least in part, on the scan. This may include, for example, a stationary scanner located at one or more supply chain entities 150 that scans items as the items pass near the scanner. As explained in more detail below, auto-encoder system 110, archive system 120, one or more planning and execution systems 130a-130n, one or more networked imaging devices 140, and/or one or more supply chain entities 150 may use the mapping of an item to locate the item in supply chain network 100. The location of the item may be used to coordinate the storage and transportation of items in supply chain network 100 according to one or more plans and/or a reallocation of materials or capacity generated by one or more planning and execution systems 130a-130n. Plans may comprise one or more of a master supply chain plan, production plan, operations plan, distribution plan, and the like.

In addition, one or more sensors 146 of one or more networked imaging devices 140 may be located at one or more locations local to, or remote from, one or more networked imaging devices 140. For example, one or more sensors 146 are integrated into one or more networked imaging devices 140, or one or more sensors 146 are remotely located from, but communicatively coupled with, one or more networked imaging devices 140. According to some embodiments, one or more sensors 146 may be configured to communicate directly or indirectly with one or more of auto-encoder system 110, archive system 120, one or more planning and execution systems 130a-130n, one or more networked imaging devices 140, one or more supply chain entities 150, one or more computers 160, and/or network 170 using communication links 180a-180g.

One or more supply chain entities 150 may represent one or more suppliers, manufacturers, distribution centers, and retailers in one or more supply chain networks 100, including one or more enterprises. One or more suppliers may be any suitable entity that offers to sell or otherwise provides one or more components to one or more manufacturers. One or more suppliers may, for example, receive a product from a first supply chain entity in supply chain network 100 and provide the product to another supply chain entity. One or more suppliers may comprise automated distribution systems that automatically transport products to one or more manufacturers based, at least in part, on a supply chain plan, the number of items currently in stock at one or more supply chain entities 150, the number of items currently in transit in transportation network 130a, a forecasted demand, a supply chain disruption, a material or capacity reallocation, current and projected inventory levels at one or more stocking locations, and/or one or more additional factors described herein.

A manufacturer may be any suitable entity that manufactures at least one product. A manufacturer may use one or more items during the manufacturing process to produce any manufactured, fabricated, assembled, or otherwise processed item, material, component, good or product. Items may comprise, for example, components, materials, products, parts, supplies, or other items, that may be used to produce products. In addition, or as an alternative, an item may comprise a supply or resource that is used to manufacture the item, but does not become a part of the item. In one embodiment, a product represents an item ready to be supplied to, for example, another supply chain entity, such as a supplier, an item that needs further processing, or any other item. A manufacturer may, for example, produce and sell a product to a supplier, another manufacturer, a distribution center, a retailer, a customer, or any other suitable person or an entity. Such manufacturers may comprise automated robotic production machinery that produce products based, at least in part, on a supply chain plan, the number of items currently in stock at one or more supply chain entities 150, the number of items currently in transit in transportation network 130a, a forecasted demand, a supply chain disruption, a material or capacity reallocation, current and projected inventory levels at one or more stocking locations, and/or one or more additional factors described herein.

One or more distribution centers may be any suitable entity that offers to sell or otherwise distributes at least one product to one or more retailers and/or customers. Distribution centers may, for example, receive a product from a first supply chain entity in supply chain network 100 and store and transport the product for a second supply chain entity. Such distribution centers may comprise automated warehousing systems that automatically transport to one or more retailers or customers and/or automatically remove an item from, or place an item into, inventory based, at least in part, on a supply chain plan, the number of items currently in stock at one or more supply chain entities 150, the number of items currently in transit in transportation network 130a, a forecasted demand, a supply chain disruption, a material or capacity reallocation, current and projected inventory levels at one or more stocking locations, and/or one or more additional factors described herein.

One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location, and which may be based, at least in part, on a supply chain plan, the number of items currently in stock at one or more supply chain entities 150, the number of items currently in transit in transportation network 130a, a forecasted demand, a supply chain disruption, a material or capacity reallocation, current and projected inventory levels at one or more stocking locations, and/or one or more additional factors described herein.

Although one or more suppliers, manufacturers, distribution centers, and retailers are shown and described as separate and distinct entities, the same entity may simultaneously act as any one or more suppliers, manufacturers, distribution centers, and retailers. For example, one or more manufacturers acting as a manufacturer could produce a product, and the same entity could act as a supplier to supply a product to another supply chain entity. Although one example of a supply chain network is shown and described, embodiments contemplate any configuration of supply chain network 100, without departing from the scope of the present disclosure.

As shown in FIG. 1, supply chain network 100 comprising auto-encoder system 110, archive system 120, one or more planning and execution systems 130a-130n, one or more networked imaging devices 140, and one or more supply chain entities 150 may operate on one or more computers 160 that are integral to or separate from the hardware and/or software that support auto-encoder system 110, archive system 120, one or more planning and execution systems 130a-130n, one or more networked imaging devices 140, and one or more supply chain entities 150. One or more computers 160 may include any suitable input device 162, such as a keypad, mouse, touch screen, microphone, or other device to input information. Output device 164 may convey information associated with the operation of supply chain network 100, including digital or analog data, visual information, or audio information.

One or more computers 160 may include fixed or removable computer-readable storage media, including a non-transitory computer readable medium, magnetic computer disks, flash drives, CD-ROM, in-memory device or other suitable media to receive output from and provide input to supply chain network 100. One or more computers 160 may include one or more processors 166 and associated memory to execute instructions and manipulate information according to the operation of supply chain network 100 and any of the methods described herein. In addition, or as an alternative, embodiments contemplate executing the instructions on one or more computers 160 that cause one or more computers 160 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible computer-readable media that have computer-readable instructions encoded thereon, and the instructions may comprise instructions to perform functions of the methods described herein.

Auto-encoder system 110, archive system 120, one or more planning and execution systems 130a-130n, one or more networked imaging devices 140, and one or more supply chain entities 150 may each operate on one or more separate computers, a network of one or more separate or collective computers, or may operate on one or more shared computers. In addition, supply chain network 100 may comprise a cloud-based computing system having processing and storage devices at one or more locations, local to, or remote from auto-encoder system 110, archive system 120, one or more planning and execution systems 130a-130n, one or more networked imaging devices 140, and one or more supply chain entities 150. In addition, each of the one or more computers 160 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with auto-encoder system 110, archive system 120, one or more planning and execution systems 130a-130n, one or more networked imaging devices 140, and one or more supply chain entities 150.

These one or more users may include, for example, a "manager" or a "planner" handling supply chain planning, training auto-encoder system 110, training the machine learning model, and/or one or more related tasks within supply chain network 100. In addition, or as an alternative, these one or more users within supply chain network 100 may include, for example, one or more computers 160 programmed to autonomously handle, among other things, production planning, demand planning, option planning, sales and operations planning, operation planning, supply chain master planning, plan adjustment after supply chain disruptions, order placement, automated warehouse operations (including removing items from and placing items in inventory), robotic production machinery (including producing items), and/or one or more related tasks within supply chain network 100.

In one embodiment, auto-encoder system 110 may be coupled with network 170 using communication link 180a, which may be any wireline, wireless, or other link suitable to support data communications between auto-encoder system 110 and network 170 during operation of supply chain network 100. Archive system 120 may be coupled with network 170 using communication link 180b, which may be any wireline, wireless, or other link suitable to support data communications between archive system 120 and network 170 during operation of supply chain network 100. One or more planning and execution systems 130a-130n may be coupled with network 170 using communication link 180d, which may be any wireline, wireless, or other link suitable to support data communications between one or more planning and execution systems 130a-130n and network 170 during operation of supply chain network 100. One or more networked imaging devices 140 are coupled with network 170 using communication link 180e, which may be any wireline, wireless, or other link suitable to support data communications between one or more networked imaging devices 140 and network 170 during operation of supply chain network 100. One or more supply chain entities 150 may be coupled with network 170 using communication link 180f, which may be any wireline, wireless, or other link suitable to support data communications between one or more supply chain entities 150 and network 170 during operation of supply chain network 100. One or more computers 160 may be coupled with network 170 using communication link 180g, which may be any wireline, wireless, or other link suitable to support data communications between one or more computers 160 and network 170 during operation of supply chain network 100. Although communication links 180a-180g are shown as generally coupling auto-encoder system 110, archive system 120, one or more planning and execution systems 130a-130n, one or more networked imaging devices 140, one or more supply chain entities 150, and one or more computers 160 to network 170, each of auto-encoder system 110, archive system 120, one or more planning and execution systems 130a-130n, one or more networked imaging devices 140, one or more supply chain entities 150, and one or more computers 160 may communicate directly with each other, according to particular needs.

In another embodiment, network 170 includes the Internet and any appropriate local area networks (LANs), metropolitan area networks (MANs), or wide area networks (WANs) coupling auto-encoder system 110, archive system 120, one or more planning and execution systems 130a-130n, one or more networked imaging devices 140, one or more supply chain entities 150, and one or more computers 160. For example, data may be maintained locally by, or externally of, auto-encoder system 110, archive system 120, one or more planning and execution systems 130a-130n, one or more networked imaging devices 140, one or more supply chain entities 150, and one or more computers 160 and made available to one or more associated users of auto-encoder system 110, archive system 120, one or more planning and execution systems 130a-130n, one or more networked imaging devices 140, one or more supply chain entities 150, and one or more computers 160 using network 170 or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, one or more planning and execution systems 130a-130n may generate a supply chain plan. Furthermore, one or more computers 160 associated with one or more planning and execution systems 130a-130n may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on a supply chain plan, the number of items currently in stock at one or more supply chain entities 150, the number of items currently in transit in transportation network 130a, a forecasted demand, a supply chain disruption, a material or capacity reallocation, current and projected inventory levels at one or more stocking locations, and/or one or more additional factors described herein. For example, the methods described herein may include one or more computers 160 receiving product data 264 from automated machinery having at least one sensor and product data 264 corresponding to an item detected by the automated machinery. The received product data may include an image of the item, an identifier, as described above, and/or product information associated with the item, including, for example, dimensions, texture, estimated weight, and the like. One or more computers 160 may also receive, from one or more sensors 146 of one or more networked imaging devices 140, a current location of the identified item.

The methods may further include one or more computers 160 looking up the received product data in the database system associated with one or more planning and execution systems 130a-130n to identify the item corresponding to product data 264 received from automated machinery. Based on the identification of the item, one or more computers 160 may also identify (or alternatively generate) a first mapping in the database system, where the first mapping is associated with the current location of the identified item. One or more computers 160 may also identify a second mapping in the database system, where the second mapping is associated with a past location of the identified item. One or more computers 160 may also compare the first mapping and the second mapping to determine if the current location of the identified item in the first mapping is different than the past location of the identified item in the second mapping. One or more computers 160 may send instructions to the automated machinery based, at least in part, on one or more differences between the first mapping and the second mapping such as, for example, to locate items to add to or remove from an inventory of or shipment for one or more supply chain entities 150. In addition, or as an alternative, one or more planning and execution systems 130a-130n monitors one or more supply chain constraints of one or more items at one or more supply chain entities 150 and adjusts the orders and/or inventory of one or more supply chain entities 150 at least partially based on one or more supply chain constraints.

Figure 2:
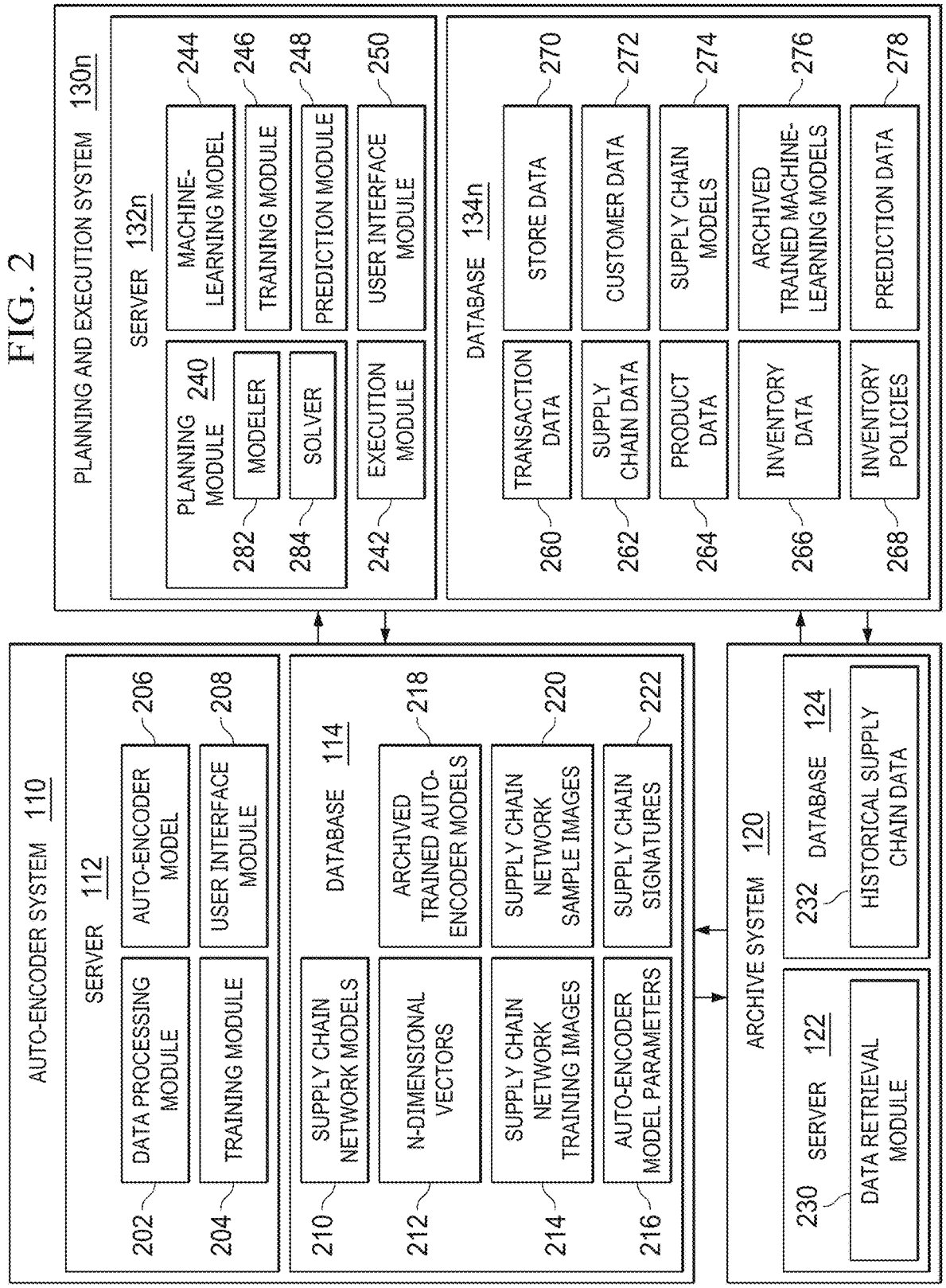
FIG. 2 illustrates the auto-encoder system, the archive system, and the planning and execution system of FIG. 1 in greater detail, in accordance with the first embodiment.

FIG. 2 illustrates auto-encoder system 110, archive system 120, and planning and execution system 130n of FIG. 1 in greater detail, in accordance with an embodiment. Auto-encoder system 110 comprises server 112 and database 114, as disclosed above. Although auto-encoder system 110 is shown as comprising a single server 112 and a single database 114, embodiments contemplate any suitable number of servers or databases internal to or externally coupled with auto-encoder system 110.

Server 112 of auto-encoder system 110 comprises data processing module 202, training module 204, auto-encoder model 206, and user interface module 208. Although server 112 is shown and described as comprising a single data processing module 202, a single training module 204, a single auto-encoder model 206, and a single user interface module 208, embodiments contemplate any suitable number or combination of these located at one or more locations, local to, or remote from auto-encoder system 110, such as on multiple servers or computers at one or more locations in supply chain network 100.

Database 114 of auto-encoder system 110 may comprise one or more databases or other data storage arrangement at one or more locations, local to, or remote from, server 112. Database 114 of auto-encoder system 110 comprises, for example, supply chain network models 210, n-dimensional vectors 212, supply chain network training images 214, auto-encoder model parameters 216, archived trained auto-encoder models 218, supply chain network samples images 220, and supply chain signatures 222. Although database 114 of auto-encoder system 110 is shown and described as comprising supply chain network models 210, n-dimensional vectors 212, supply chain network training images 214, auto-encoder model parameters 216, archived trained auto-encoder models 218, supply chain network samples images 220, and supply chain signatures 222, embodiments contemplate any suitable number or combination of these, located at one or more locations, local to, or remote from, auto-encoder system 110 according to particular needs.

In one embodiment, data processing module 202 of auto-encoder system 110 receives data from archive system 120, one or more planning and execution systems 130a-130n, one or more networked imaging devices 140, one or more supply chain entities 150, one or more computers 160, or one or more data storage locations local to, or remote from, supply chain network 100 and auto-encoder system 110, and prepares the data for use in training auto-encoder model 206, generating supply chain network training images 214 and supply chain network sample images 220, classifying supply chain network models 210, determining similarity between supply chain network models 210, and transforming data received from one module to a different data structure for use by a second module. Data processing module 202 may check received data for errors in the range, sign, and/or value and use statistical analysis to check the quality or the correctness of the data. As described in further detail below, data processing module 202 transforms the object model of supply chain network 100 from a binary string to an integer array, each byte of the binary corresponding to one integer of the array.

In one embodiment, the binary comprises a hexadecimal binary generated by one or more solvers of a supply chain planner 130c to model and solve a supply chain planning problem. In one embodiment, solver 284 constructs a model representing the dynamic and static structure of a supply chain network and generates a solution or other output generated when solving the model. By way of example only and not by way of limitation, the model object may comprise a mathematical formulation of the supply chain planning problem, which includes the network structure and the dynamic properties, such as, for example, capacities, materials, operations, yield rate, lead time, and the like. Data processing module 202 stores the model and its solution together and generates a configuration file indicating the identity and location of each model and its corresponding solution. Machine learning model 240 retrieves the binary of the model and solver 284 output using the identity and location data stored in the configuration file, as described in further detail below. According to some embodiments, data processing module 202 converts the binary model object to n-dimensional vectors 212. By way of example only and not by way of limitation, data processing module 202 converts an integer array into an 8-bit image, wherein each pixel of the image corresponds to one integer from the array. These images are used as supply chain network training images 214 and supply chain network sample images 220. However, the binaries for supply chains having different sizes or complexity will have different sizes, as well. Generating images from differently-sized binaries results in differently-sized images. Embodiments of data processing module 202 convert the differently-sized images to the same size using an image transformation process prior to sending the image to an auto-encoder for training or sampling. A length and a width of the image may correspond to the number of rows and the number of columns of the integer array from which it was constructed, wherein each element of the array corresponds to a single pixel. The dimensions of the images may however be selected as any suitable dimensions to tune the performance of auto-encoder model 206 and machine learning model 240, according to particular needs.

As disclosed above and as described in further detail below, training module 204 trains auto-encoder model 206 using images created from supply chain network models 210. For example, training module 204 learns auto-encoder model parameters 216, using back propagation of the error to minimize the differences between the image created from supply chain network 100 encoded by the supply chain signature and the output image, which is reconstructed by decoding the supply chain signature. In one embodiment, training module 204 calculates the error between the input image and the output image using the Root Mean-Squared Error (RMSE), according to Equation 1:

$$RMSE = \sqrt{\frac{1}{\text{num pixels}} * \sum_{i}^{\text{num\_pixels}} (pixel_{input} - pixel_{output})^2} \quad (1)$$

wherein, num_pixels is the quantity of pixels of the image, $pixel_{input}$ is the value of a pixel of the input image, $pixel_{output}$ is the value of the same pixel in the output image.

User interface module 208 of auto-encoder system 110 generates and displays a user interface (UI), such as, for example, a graphical user interface (GUI), that displays one or more interactive visualizations of supply chain network models 210, supply chain network training images 214, auto-encoder model parameters 216, archived trained auto-encoder models 218, supply chain network samples images 220, and supply chain signatures 222. According to embodiments, user interface module 208 displays a GUI comprising interactive elements for selecting one or more supply chain network models 210, in response to the selection, calculating supply chain signatures 222, and comparing the selected one or more signatures of supply chain signatures 222 to one or more signatures of one or more other supply chain networks. In one embodiment, user interface module 208 causes the GUI to display supply chain data 262 for the most similar supply chain network, as calculated by locating one or more signature of the network from supply chain signatures 222 using a vector space model.

The various types of data stored in database 114 of auto-encoder system 110 will now be discussed.

Supply chain network models 210 represent the flow of materials through one or more supply chain entities 150 of supply chain network 100. As descried in more detail below, modeler 282 of planning module 260 of supply chain planner 130c models the flow of materials through one or more supply chain entities 150 of supply chain network 100 as one or more supply chain network models 210 comprising a network of nodes and edges. The material storage and/or transition units are modelled as nodes, which may be referred to as, for example, buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modelled as edges connecting the nodes. Each edge may represent the flow, transportation, or assembly of materials (such as items or resources) between the nodes by, for example, production processing or transportation. A planning horizon for supply chain network models 210 may be broken down into elementary time-units, such as, for example, time-buckets, or, simply, buckets. The edge between two buffer nodes may denote processing of material and the edge between different buckets for the same buffer may indicate inventory carried forward. Flow-balance constraints for most, if not every buffer in every bucket, model the material movement in supply chain network 100. Supply chain network models 210 may include any dynamic supply chain data, including for example, the one or more material constraints, one or more capacity constraints, lead times, yield rates, inventory levels, safety stock, demand dates, and/or the like. Although supply chain network models 210 are shown and described as comprising a network of nodes and edges, embodiments contemplate supply chain network models 210 comprising any suitable model that represents one or more components of supply chain network 100 using any suitable model, according to particular needs.

According to embodiments, integer arrays, as disclosed above, correspond to n-dimensional vectors 212, wherein data processing module 202 creates each integer of the array from each eight bits of a binary. Because data processing module 202 converts each integer of the array into a pixel of supply chain network training images 214 and supply chain network sample images 220, each pixel of these images correspond to one dimension of n-dimensional vectors 212.

As described in further detail below, supply chain network training images 214 may be created from, or transformed into, an array of integers or real numbers, wherein each element of the array indicates the value of a single pixel. As disclosed above, these images provide the input for auto-encoder model 206.

The archived trained auto-encoder models 218 comprise previously trained auto-encoder models. Auto-encoder system 110 and one or more planning and execution systems 130a-130n may retrieve, load, and execute a particular previously-trained auto-encoder model in a first instance and retrieve, load, and execute a different trained model in a second instance. In one embodiment, auto-encoder system 110 selects the previously-trained auto-encoder model that was trained with instances of the same (or a similar) supply chain network, such as, for example, a supply chain network having a similar static supply chain structure.

Supply chain network sample images 220 comprise one or more images created by data processing module 202 from sample supply chain network models 210 and which are used as an input to a trained auto-encoder model to create supply chain signatures 222 for a sample supply chain network. In one embodiment, the sample supply chain network is the current supply chain network being analyzed by auto-encoder system 110 or supply chain planner 130c. Supply chain signatures 222 for supply chain networks are generated from the representation layer between the encoder and decoder of auto-encoder model 206, as disclosed in further detail below.

As disclosed above, archive system 120 comprises server 122 and database 124. Although archive system 120 is shown as comprising a single server 120 and a single database 122, embodiments contemplate any suitable number of servers or databases internal to or externally coupled with archive system 120.

Server 122 of archive system 120 comprises data retrieval module 230. Although server 122 is shown and described as comprising a single data retrieval module 230, embodiments contemplate any suitable number or combination of data retrieval modules located at one or more locations, local to, or remote from archive system 120, such as on multiple servers or computers at one or more locations in supply chain network 100.

In one embodiment, data retrieval module 230 of archive system 120 receives historical supply chain data 232 from one or more planning and execution systems 130a-130n and/or one or more supply chain entities 150 and stores the received historical supply chain data in database 124. According to one embodiment, data retrieval module 230 may prepare historical supply chain data 232 for use by supply chain planner 130c to generate variants of the supply chain planning problem by checking historical supply chain data 232 for errors and transforming historical supply chain data 232 to normalize, aggregate, and/or rescale historical supply chain data 232 to allow direct comparison of data received from different planning and execution systems and one or more supply chain entities at one or more other locations local to, or remote from, archive system 120. According to embodiments, data retrieval module 230 receives data from one or more sources external to supply chain network 100, such as, for example, weather data, special events data, social media data, calendars, and the like and stores the received data as historical supply chain data 232.

Database 124 of archive system 120 may comprise one or more databases or other data storage arrangement at one or more locations, local to, or remote from, server 122. Database 124 of archive system 120 comprises, for example, historical supply chain data 232. Although database 124 of archive system 120 is shown and described as comprising historical supply chain data 232, embodiments contemplate any suitable number or combination of data, located at one or more locations, local to, or remote from, archive system 120, according to particular needs.

Historical supply chain data 232 comprises data received from auto-encoder system 110, archive system 120, one or more planning and execution systems 130a-130n, one or more supply chain entities 150, one or more computers 160, and/or one or more locations local to, or remote from, supply chain network 100, such as, for example, one or more sources for weather data, special events data, social media data, calendars, and the like. According to one embodiment, historical supply chain data 232 comprises historic sales patterns, prices, promotions, weather conditions and other factors influencing demand of one or more items sold in one or more stores over a time period, such as, for example, one or more days, weeks, months, years, including, for example, a day of the week, a day of the month, a day of the year, week of the month, week of the year, month of the year, special events, paydays, and the like. When generating variants of the supply chain planning problem, supply chain planner 130c may calculate supply chain plans over a historical time period, such as, for example, any of the time periods represented by historical supply chain data 232.

As disclosed above, planning and execution systems 130a-130n comprise servers 132a-132n and databases 134a-134n. Although planning and execution systems 130a-130n are shown and described a single planning and execution system 130n comprising a single server 132n and a single database 134n, embodiments contemplate any suitable number of servers or databases internal to or externally coupled with any planning and execution systems 130a-130n, according to particular needs.

By way of example only and not by way of limitation, server 132n comprises planning module 240, execution module 242, machine-learning model 244, training module 246, prediction module 248, and user interface module 250. Although server 132n is shown and described as comprising a single planning module 240, a single execution module 242, a single machine-learning model 244, a single training module 246, a single prediction module 248, and a single user interface module 250, embodiments contemplate any suitable number or combination of planning modules, execution modules, machine learning models, training modules, prediction modules, and user interface modules, located at one or more locations, local to, or remote from any of planning and execution systems 130a-130n, such as on multiple servers or computers at one or more locations in supply chain network 100.

Continuing with the example planning and execution system 130n, database 134n may comprise one or more databases or other data storage arrangement at one or more locations, local to, or remote from, server 132n. Databases 134a-134n of planning and execution systems 130a-130n may comprise, for example, transaction data 260, supply chain data 262, product data 264, inventory data 266, inventory policies 268, store data 270, customer data 272, supply chain models 274, archived trained machine-learning models 276, and predictions data 278. Although database 134n of planning and execution system 130n is shown and described as comprising transaction data 260, supply chain data 262, product data 264, inventory data 266, inventory policies 268, store data 270, customer data 272, supply chain models 274, archived trained machine-learning models 276, and predictions data 278, embodiments contemplate any suitable number or combination of data, located at one or more locations, local to, or remote from, supply chain the planning and execution system, according to particular needs.

Server 132n of planning and execution system 130n comprises planning module 240. Planning module 240 comprises modeler 282 and solver 284. Although planning module 240 is shown and described as comprising a single modeler 282 and a single solver 284, embodiments contemplate any suitable number or combination of these located at one or more locations, local to, or remote from planning module 240, such as on multiple servers or computers at any location in supply chain network 100.

Modeler 282 may model one or more supply chain planning problems of supply chain network 100. According to one embodiment, modeler 282 of server 132n identifies resources, operations, buffers, and pathways, and maps supply chain network 100 using supply chain network models 210, as described in further detail below. For example, modeler 282 of server 132n models a supply chain planning problem that represents supply chain network 100 as a supply chain network model, an LP optimization problem, or other type of input to solver 284. As discussed above, modeler 282 provides supply chain network 100 model to auto-encoder system 110, which processes supply chain network 100 model into supply chain signatures 222.

According to embodiments, solver 284 of planning module 240 generates a solution to a supply chain planning problem. Solver 284 may comprise an LP optimization solver, a heuristic solver, a mixed-integer problem solver, a MAP solver, LP solver, Deep Tree solver, and the like. According to embodiments, solver 284 solves a supply chain planning problem and auto-encoder model 206 generates supply chain signatures 222 for the same supply chain planning problem.

Execution module 242 of planning and execution system 130n executes one or more supply chain processes such as, for example, instructing automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on a supply chain plan, the number of items currently in stock at one or more supply chain entities 150, the number of items currently in transit in transportation network 130a, a forecasted demand, a supply chain disruption, a material or capacity reallocation, current and projected inventory levels at one or more stocking locations, and/or one or more additional factors described herein. For example, execution module 242 may send instructions to the automated machinery to locate items to add to or remove from an inventory of or shipment for one or more supply chain entities 150.

In one embodiment, machine-learning model 244 creates an autonomous and self-learning supply chain solver. Machine learning model 244, after training by training module 246, generates a solution to one or more supply chain planning problems using supply chain signatures 222 generated by auto-encoder model 206. Server 132*n* comprises prediction module 248, which receives supply chain signatures 222 from auto-encoder system 110 and applies supply chain signatures 222 to machine-learning model 244 to generate the solution to the supply chain planning problem, without using solver 284, as disclosed above.

User interface module 250 of planning and execution system 130*n* generates and displays a UI, such as, for example, a GUI, that displays one or more interactive visualizations of transaction data 260, supply chain data 262, product data 264, inventory data 266, inventory policies 268, store data 270, customer data 272, supply chain models 274, archived trained machine-learning models 276, and prediction data 278. According to embodiments, user interface module 250 displays a GUI comprising interactive graphical elements for selecting one or more supply chain network components, modeling supply chain network 100 as an object model, formulating supply chain network 100 as a supply chain planning problem, solving the supply chain planning problem, generating predictions from archived trained machine-learning models 276, and displaying one or more solutions and/or supply chain plans.

The various types of data stored in database 134*n* of planning and execution system 130*n* will now be discussed.

Transaction data 260 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 260 is represented by any suitable combination of values and dimensions, aggregated or un-aggregated, such as, for example, sales per week, sales per week per location, sales per day, sales per day per season, or the like.

Supply chain data 262 may comprise any data of one or more supply chain entities 150 including, for example, item data, identifiers, metadata (comprising dimensions, hierarchies, levels, members, attributes, cluster information, and member attribute values), fact data (comprising measure values for combinations of members) of one or more supply chain entities 150. Supply chain data 262 may also comprise for example, various decision variables, business constraints, goals, and objectives of one or more supply chain entities 150. According to some embodiments, supply chain data 262 may comprise hierarchical objectives specified by, for example, business rules, master planning requirements, scheduling constraints, and discrete constraints, including, for example, sequence dependent setup times, lot-sizing, storage, shelf life, and the like.

Product data 264 of database 134*n* may comprise products identified by, for example, a product identifier (such as a Stock Keeping Unit (SKU), Universal Product Code (UPC) or the like), and one or more attributes and attribute types associated with the product ID. Product data 264 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 266 of database 134*n* may comprise any data relating to current or projected inventory quantities or states, order rules, or the like. For example, inventory data 266 may comprise the current level of inventory for each item at one or more stocking points across supply chain network 100. In addition, inventory data 266 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130*n* accesses and stores inventory data 266 in database 134*n*, which may be used by planning and execution system 130*n* to place orders, set inventory levels at one or more stocking points, initiate manufacturing of one or more components, or the like in response to, and based at least in part on, a supply chain plan or other output of planning and execution system 130*n*. In addition, or as an alternative, inventory data 266 may be updated by receiving current item quantities, mappings, or locations from one or more planning and execution systems 130*a*-130*n* and/or one or more networked imaging devices 140.

Inventory policies 268 of database 134*n* may comprise any suitable inventory policy describing the reorder point and target quantity, or other inventory policy parameters that set rules for planning and execution system 130*n* to manage and reorder inventory. Inventory policies 268 may be based on target service level, demand, cost, fill rate, or the like. According to embodiment, inventory policies 268 comprise target service levels that ensure that a service level of one or more supply chain entities 150 is met with a certain probability. For example, one or more supply chain entities 150 may set a service level at 95%, meaning one or more supply chain entities 150 will set the desired inventory stock level at a level that meets demand 95% of the time. Although, a particular service level target and percentage is described; embodiments contemplate any service level or target, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, auto-encoder system 110 and/or planning and execution system 130*n* may determine a replenishment order according to one or more replenishment rules, which, among other things, indicates to one or more supply chain entities 150 to determine or receive inventory to replace the depleted inventory. By way of example and not of limitation, an inventory policy for non-perishable goods with linear holding and shorting costs comprises a min/max (s,S) inventory policy. Inventory policies 268 may be used for perishable goods, such as fruit, vegetables, dairy, fresh meat, as well as electronics, fashion, and similar items for which demand drops significantly after a next generation of electronic devices or a new season of fashion is released.

Store data 270 may comprise data describing the stores of one or more retailers and related store information. Store data 270 may comprise, for example, a store ID, store description, store location details, store location climate, store type, store opening date, lifestyle, store area (expressed in, for example, square feet, square meters, or other suitable measurement), latitude, longitude, and other similar data. Store data 270 may include demand forecasts for each store indicating future expected demand based on, for example, any data relating to past sales, past demand, purchase data, promotions, events, or the like of one or more supply chain entities 150. The demand forecasts may cover a time interval such as, for example, by the minute, hour, daily, weekly, monthly, quarterly, yearly, or any suitable time interval, including substantially in real time. Although demand forecasts are described as comprising a particular store, supply chain planner 130c may calculate a demand forecast at any granularity of time, customer, item, region, or the like.

Customer data 272 may comprise customer identity information, including, for example, customer relationship management data, loyalty programs, and mappings between one or more customers and transactions associated with those one or more customers such as, for example, product purchases, product returns, customer shopping behavior, and the like. Customer data 272 may comprise data relating customer purchases to one or more products, geographical regions, store locations, time period, or other types of dimensions.

Supply chain models 274 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 274 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model.

In one embodiment, archived trained machine-learning models 276 comprise one or more trained machine learning models used by planning and execution system 130n for predicting a solution to a supply chain planning problem, such as, for example, a supply chain plan. Predictions data 288 are the predictions generated by machine-learning model 244. For machine-learning model 244 trained using signatures 222 and solutions of the supply chain planning problem, the predictions are the supply chain planning problem solution.

As disclosed above, modeling a supply chain network provides modelling of various material and capacity constraints and demand requirements. To create supply chain network models 210, supply chain network 100 may be modelled to represent the flow of materials and resources between one or more supply chain entities 150 in accordance with the constraints at each operation, buffer, and resource.

Figure 3:
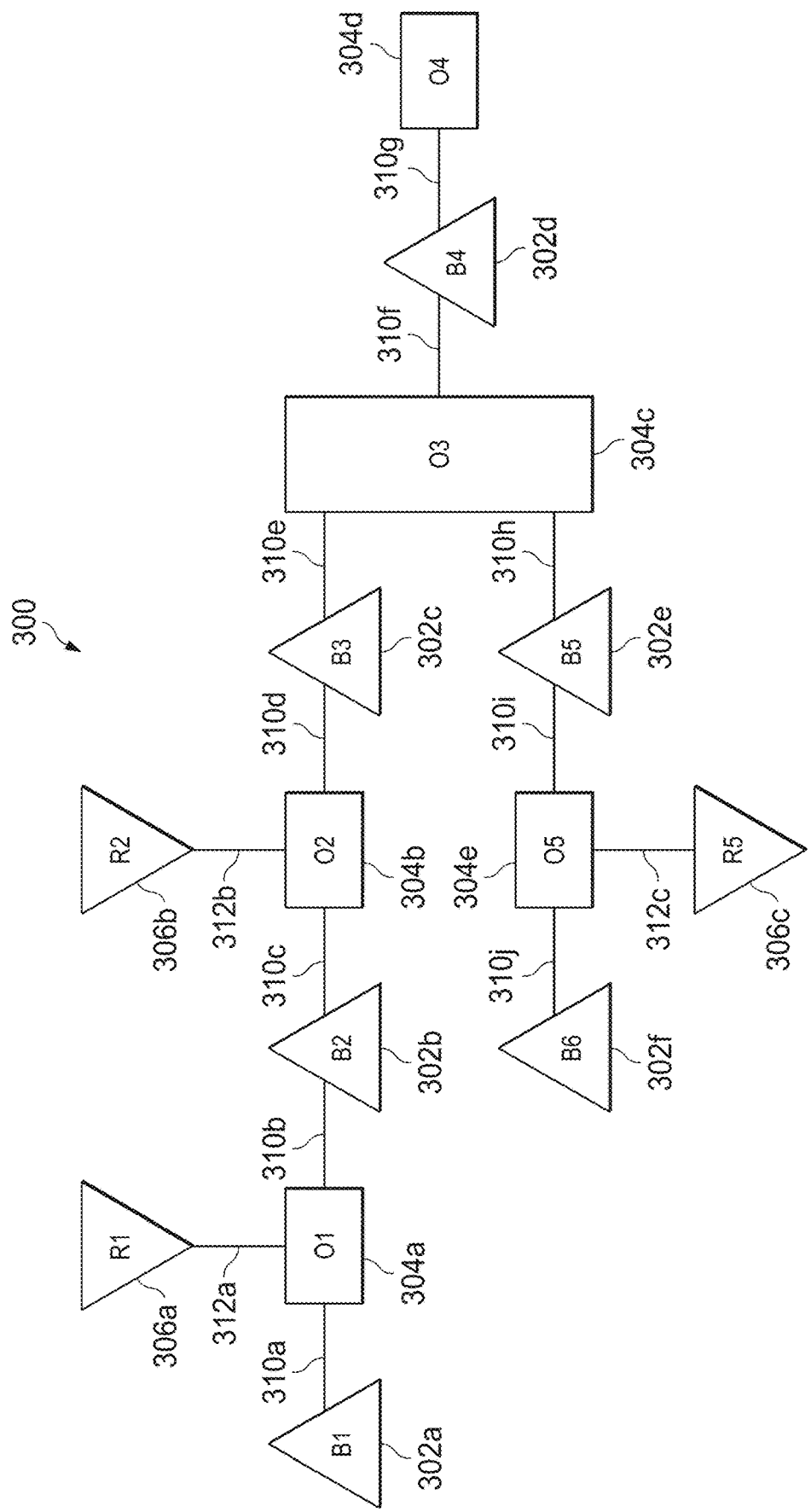
FIG. 3 illustrates a simplified supply chain network model, in accordance with an embodiment.

FIG. 3 illustrates simplified supply chain network model 300, according to an embodiment. Supply chain network 100 represented by simplified supply chain network model 300 comprises six material buffers 302a-302f (B1-B6) storing materials or items, five operations 304a-304e (O1-O5) for processing materials and items, and three resources 306a-306c (R1, R2, and R5), which represent capacity limitations on each of operations 304a-304e to which they are connected. Four operations 304a, 304b, 304d and 304e (O1, O2, O4, O5) have a single material or item as input and a single material or item as output. A single operation 304c (O3) requires two materials or items as input (i.e. materials or items stored at material buffers 302c and 302e (B3 and B5)) and produces a single item as output (materials or items stored at material buffer 302d (B4)). According to one embodiment of simplified supply chain network model 300, materials flow from upstream nodes to downstream nodes along each of edges 310a-310j and 312a-312c from left to right from, for example, raw materials to finished products. However, flows may be bidirectional, and one or more materials may flow from right to left, from a downstream node to an upstream node.

Simplified supply chain network model 300 may begin at the most upstream nodes representing material buffers 302a and 302f (B1, B6), such as, for example, raw material buffers. Raw material buffers may receive the initial input for a manufacturing process. For example, raw materials may comprise metal, fabric, adhesives, polymers, and other materials and compounds required for manufacturing. The flow of materials from the upstream material buffers is indicated by edges 310a and 310j, which identify operations 304a and 304e (O1, O5) is a possible destination for the materials. For example, raw materials may be transported to operations 304a and 304e comprising a production process, such as producing one or more intermediate items from the raw materials which are stored at material buffers 302b and 202e (B2, B5) comprising, for example, intermediate items. Operations 304a and 304e (O1, O5) are coupled by edges 312a and 312c with resources 306a and 306c (R1, R5) to indicate that operations 304a and 304e (O1, O5) require resources 306a and 306c (R1, R5) in order to process items or materials from 302a and 302f (B1, B6). According to embodiments, resources 306a and 306c (R1, R5) may include, for example, particular manufacturing, distribution, or transportation equipment and facilities, and other such resources utilized in a supply chain.

Limitations on supplying materials and items to particular buffers may represent transportation limitations (e.g. cost, time, available transportation options) or outputs of various operations (such as, for example, different production processes, which produce different items, each of which may be represented by a different SKU, and which each may be stored at different buffers). Although the limitation of the flow of items between nodes of simplified supply chain network model 300 is described as cost, timing, transportation, or production limitations, embodiments contemplate any suitable flow of items or limitations of the flow of items between any one or more different nodes of a supply chain network, according to particular needs. For a manufacturing supply chain network, transportation processes may transport, package, or ship finished goods to one or more locations internal to or external of one or more supply chain entities 150 of supply chain network 100, including, for example, shipping directly to consumers, to regional or strategic distribution centers, or to the inventory of one or more supply chain entities 150, including, for example, to replenish a safety stock for one or more items in an inventory of one or more supply chain entities 150. Particular items and processes described herein comprise a simplified description for the purpose of illustration. For example, the items may be different sizes, styles, states of same or different physical material. Similarly, a process may be any process or operation, including manufacturing, distribution, transportation, or any other suitable activity of supply chain network 100. In one embodiment, additional constraints, such as, for example, business constraints, operation constraints, and resource constraints, may be added to facilitate other planning rules.

Although, simplified supply chain network model 300 is shown and described as having a particular number of buffers, resources, and operations with a defined flow between them, embodiments contemplate any number of buffers, resources, and operations with any suitable flow between them, including any number of nodes and edges, according to particular needs. In particular, a supply chain planning problem typically comprises a supply chain networks much more complex than simplified supply chain network model 300. For example, a supply chain network often comprises multiple manufacturing plants located in different regions or countries. In addition, an item may be processed by many operations into a large number of different materials and items, where the different operations may have multiple constrained resources and multiple input items, each with their own lead, transportation, production, and cycle times. In addition, material may flow bi-directionally (either, upstream or downstream).

By transforming supply chain data 262 to supply chain signatures 222 having the same dimensionality for each instance of training data, one or more planning and execution systems 130a-130n may train and predict using machine learning-based methods. For example, using supply chain signatures 222, one or more planning and execution systems 130a-130n may apply machine-learning techniques directly to an input of solver 284, such as, for example, an input comprising supply chain planning problems or supply chain models 274.

Figure 4:
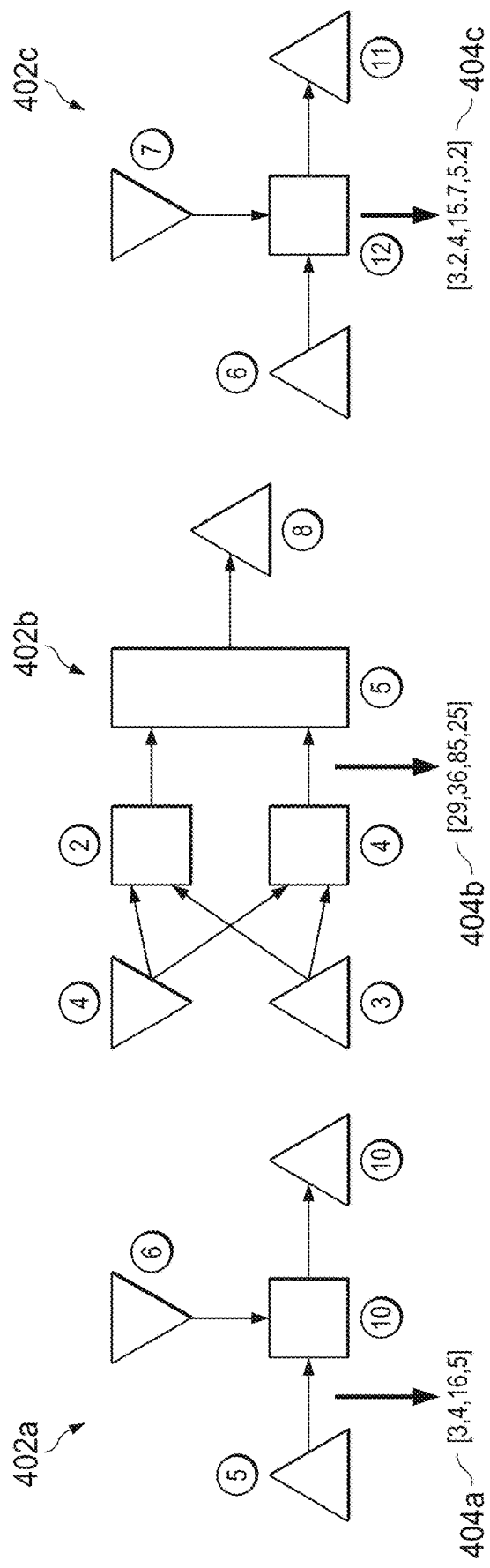
FIG. 4 illustrates simplified supply chain networks, in accordance with an embodiment.

FIG. 4 illustrates simplified supply chain networks 402a-402c, in accordance with an embodiment. Simplified supply chain networks 402a-402c include first simplified supply chain network 402a with a similar static structure as third simplified supply chain network 402c. Both first and third simplified supply chain networks 402a and 402c have a static structure that is dissimilar from the static structure of second simplified supply chain network 402b. In these examples, the static structure is represented by simplified supply chain network models (such as disclosed in connection with simplified supply chain network model 300 of FIG. 3), wherein material buffers are represented by upright triangles, resource buffers are represented by inverted triangles, and operations are represented by squares and rectangles. Each of simplified supply chain networks 402a-402c have different dynamic data, such as, for example, constraints of resources, materials, and operations (e.g. lead time constraints), represented by numerical values next to the buffers and operations. Supply chain signatures 404a-404c are associated with each of simplified supply chain networks 402a-402c, and, for these examples, supply chain signatures 404a-404c identify the values of four-dimensional vectors representing the static and dynamic properties of the simplified supply chain networks 402a-402c. Continuing with these examples, differences and similarities among the three supply chain signatures 404a-404c indicate differences and similarities of the static and dynamic supply chain data. In particular, supply chain signature 404a for first simplified supply chain network 402a is [3, 4, 16, 5], and supply chain signature 404c for third supply chain network 402c is [3.2, 4, 15.7, 5.2]. First and second supply chain signatures 404a and 404c are similar to each other, but different from second supply chain signature 404b of second supply chain network 402c, which is [29, 36, 85, 25]. Small differences (such as the quantitatively small differences between first supply chain signature 404a and third supply chain signature 404c) indicate the encoded supply chain networks have a similar structure, but may have different dynamic data. Continuing with the explanatory and non-limiting example, both first and third simplified supply chain networks 402a and 402c share a similar structure, where a first material is transformed into a second material by a single operation having a single resource. Differences in dynamic data (e.g. third simplified supply chain network 402c has increased material storage, resource capacity, and operation lead time when compared with first simplified supply chain network 402a) do not result in great quantitative differences between first and third supply chain signatures 404a and 404c, as disclosed above. Other changes in dynamic data may include, for example, a capacity increasing for a resource (such as, for example, capacity for manufacturing equipment increasing from ten days to fifteen days), changing a manufacturing process (such as, for example, producing different items, receiving items from a new or different supplier, changing one or more operations for processing, transporting, or storing one or more items), and the like.

When comparing first and third supply chain signatures 404a and 404c with second supply chain signature 404b, the large quantitative difference indicates the supply chain structure of second simplified supply chain network 402b is different from first and third simplified supply chain networks 402a and 402b. This dissimilarity in structure is indicated by, where second simplified supply chain network 402b has three operations with alternative pathways, first and third simplified supply chain networks 402a and 402c have a single operation with a single pathway. Other differences in static supply chain structure may include, for example, addition or removal of one or more supply chain entities 150 (e.g. a new manufacturer), supply chains of different customers or channels, comparisons of a different configurations of a supply chain that has evolved over time, or other like structural differences. In one embodiment, one or more planning and execution systems 130a-130n may compare the similarity or differences between supply chains by calculating an average Euclidean distance (e.g. the square of the distance) between two supply chain vectors from supply chain signatures 222. When the calculated distance between the two vectors is zero, the supply chains represented by the vectors are identical. When the calculated distance is non-zero, the length of the distance corresponds to the expected similarity between the supply chains.

Figure 5:
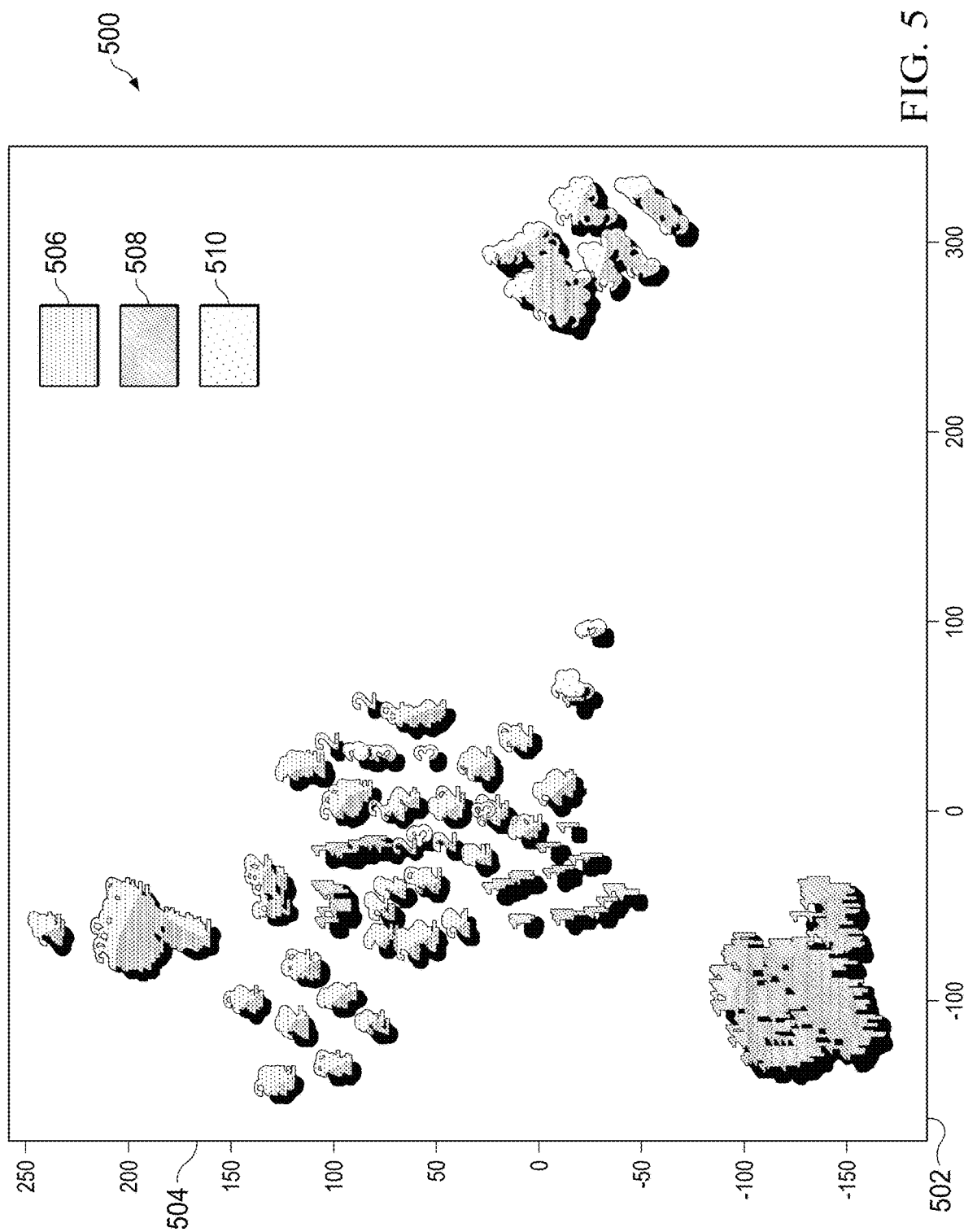
FIG. 5 illustrates a chart comparing supply chain signatures, in accordance with an embodiment.

FIG. 5 illustrates chart 500 comparing supply chain signatures 222, in accordance with an embodiment. Chart 500 comprises supply chain signatures 222 plotted using a t-Distributed Stochastic Neighbor Embedding (t-SNE) method to represent vectors of supply chain signatures 222 on a two-dimensional plot (x-axis 502 and y-axis 504). Plotted points represent three different supply chain network structures 506-510. Each plotted point of the same shading represents iterations of a supply chain network having different dynamic data (such as, for example, different demand or capacity), but the same supply chain structure. As disclosed above, supply chain signatures 222 are dissimilar for supply chain networks having different structures, which is illustrated in the chart by the iterations of each shading not clustering well with iterations of a different shading. However, supply chain signatures 222 are similar for supply chain networks having the same structure regardless of the difference of dynamic data, as shown by the iterations of each shading (e.g. supply chain network structures 506-510) clustering well to other iterations having the same shading.

Figure 6:
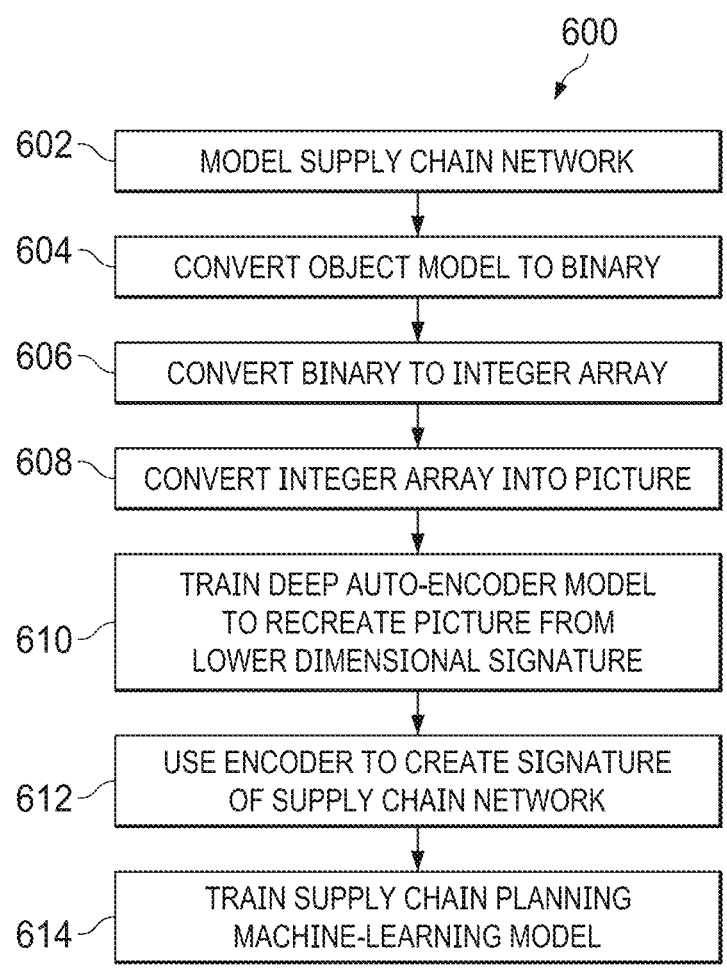
FIG. 6 illustrates a method of generating supply chain signatures, in accordance with an embodiment.

FIG. 6 illustrates method 600 of generating supply chain signatures 222, in accordance with an embodiment. Method 600 comprises one or more activities, which although described in a particular order may be implemented in one or more combinations, according to particular needs.

At activity 602, modeler 282 of one or more planning and execution systems 130a-130n creates a model of supply chain network 100. In one embodiment, modeler 282 creates a model of a supply chain planning problem that is used as an input to one or more supply chain planning solvers, such as the object model, as disclosed above.

At activity 604, data processing module 202 of auto-encoder system 110 receives the binary data representing supply chain network model. In one embodiment, data processing module 202 receives supply chain data 262 from one or more planning and execution systems 130a-130n. For example, in one embodiment, supply chain planner 130c models a supply chain network object model used as an input to solver 284 of supply chain planner 130c. Data processing module 202 may retrieve the object model directly from memory storing the supply chain object model. In another embodiment, data processing module 202 accesses the supply chain object model from a non-transitory computer readable medium associated with server 132n of planning and execution system 130n.

At activity 606 of method 600, data processing module 202 converts the binary to an integer array, wherein each consecutive byte of the binary is translated into an integer. Although the integer array is described as comprising one integer corresponding to each byte, data processing module 202 may convert a binary to an integer array using 16-bit, 32-bit, 64-bit, or any other suitable reading frame to construct each integer of the array, according to particular needs.

At activity 608, data processing module 202 converts the integer array into an image. As disclosed above, each integer from the array is converted into a single pixel of an image. At activity 610, training module 204 of auto-encoder system 110 trains auto-encoder model 206 using supply chain network training images 214. After training, auto-encoder model 206 generates supply chain signatures 222, which, as disclosed above, is a reduced-dimensionality representation of supply chain network 100 created as an intermediate layer during training of auto-encoder model 206. For example, auto-encoder model 206 passes the image representing supply chain network models 210 through a series of nonlinear mappings (which may be similar to function mapping in mathematics). The mappings are constructed such that not only is the mapping nonlinear but also each layer reduces the dimensionality of the input to generate a finite and lower-dimensional vector.

At activity 612, auto-encoder model 206 creates supply chain signatures 222 of a sample supply chain network model. As disclosed above, a particular supply chain network being analyzed may be referred to as a sample supply chain network Similar to supply chain network training images 214, disclosed above, data processing module 202 creates an image of the sample supply chain network, supply chain network samples images 220. Auto-encoder system 110 applies supply chain network sample images 220 to a trained auto-encoder model 206 which generates a supply chain signature of the sample supply chain by retrieving the output of the encoder. Supply chain signatures 222 uniquely represent supply chain networks and may be used as an input for machine learning-based methods of one or more planning and execution systems 130a-130n.

For example, one or more planning and execution systems 130a-130n may use the T-SNE method and/or a Principle Component Analysis (PCA) method to calculate the similarity or dissimilarity between two or more supply chain networks. In one embodiment, auto-encoder system 110 creates the supply chain signature as a one-hundred-dimensional vector, which is not suitable for visualizations. Using the T-SNE/PCA techniques the relationships between the various supply chain signatures having a one-hundred-dimensional vector are visualized as two-dimensional vectors, as described in further detail below. Supply chain signatures 222 vary based on the dynamic properties and physical structure of the supply chain, as disclosed above, and may form a key input to AI-based methods, such as, for example, supply chain planning using machine-learning based methods.

At activity 614, training module 244 receives training data comprising image of supply chain data 262. Auto-encoder system 110 trains an auto-encoder to compress and decompress input data with as small an error as possible, as described in further detail below.

Although supply chain signatures 222 are described as comprising a compressed form of a physical supply chain structure for machine-learning based training and prediction, embodiments contemplate creating signatures for other types of supply chain data, as described in further detail below.

Figure 7:
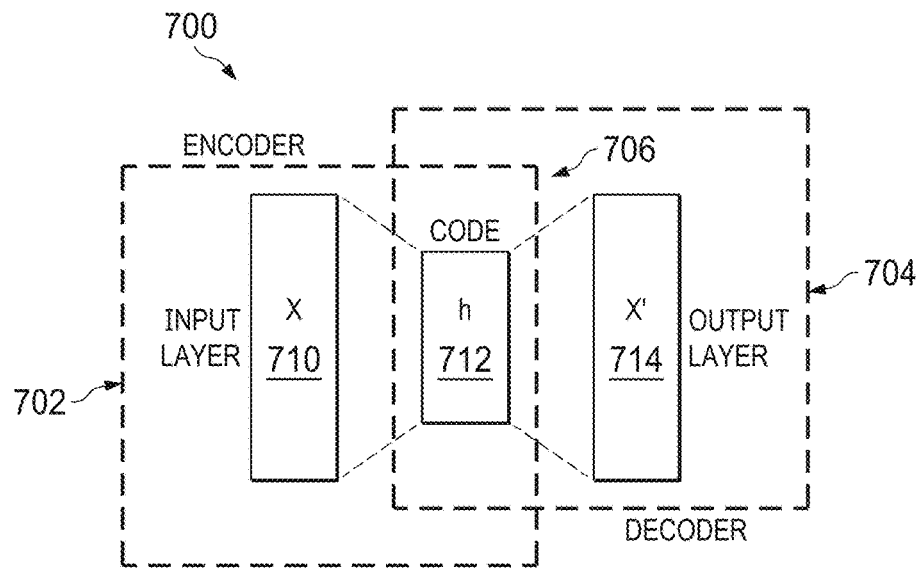
FIG. 7 illustrates a one-layer auto-encoder, in accordance with an embodiment.

FIG. 7 illustrates one-layer auto-encoder 700, in accordance with an embodiment. Auto-encoders, such as one-layer auto-encoder 700, comprise encoder 702 and decoder 704. Input layer 710 of encoder 702 receives an input, X, and transforms the input into a transformed representation 712, represented by code h. Output layer 714 of decoder 704 receives representation 712 and transforms representation 712 into an output, X', which is different than the input. Auto-encoder system 110 trains auto-encoders using a neural-network training process that compares the input of the auto-encoder with its output and, at each iteration, re-encodes the layers to minimize the difference between the input and output and reduce dimensionality. During early iterations of auto-encoder training, the input and the output may differ greatly. The training process continues to re-encode the layers at each iteration until training module 204 determines the differences between the input and output are less than a predetermined threshold. In addition, or as an alternative, training module 204 detects one or more stopping criteria, such as, for example, a user-selected margin of error, a convergence, a quantity of completed iterations, any other threshold, or other like one or more other stopping criteria. Although one-layer auto-encoder 700 is shown and described as comprising a single input layer 710 and a single output layer 712, embodiments contemplate an auto-encoder having any number of layers, according to particular needs.

When the output is acceptably similar to the input, one or more machine-learning methods may use the transformed input from one of the layers as a signature of the input, allowing dissimilar inputs to be compared by a standard n-dimensional signature. In one embodiment, the supply chain signature is the output of the encoder and the input for the decoder, as described in more detail below.

Figure 8:
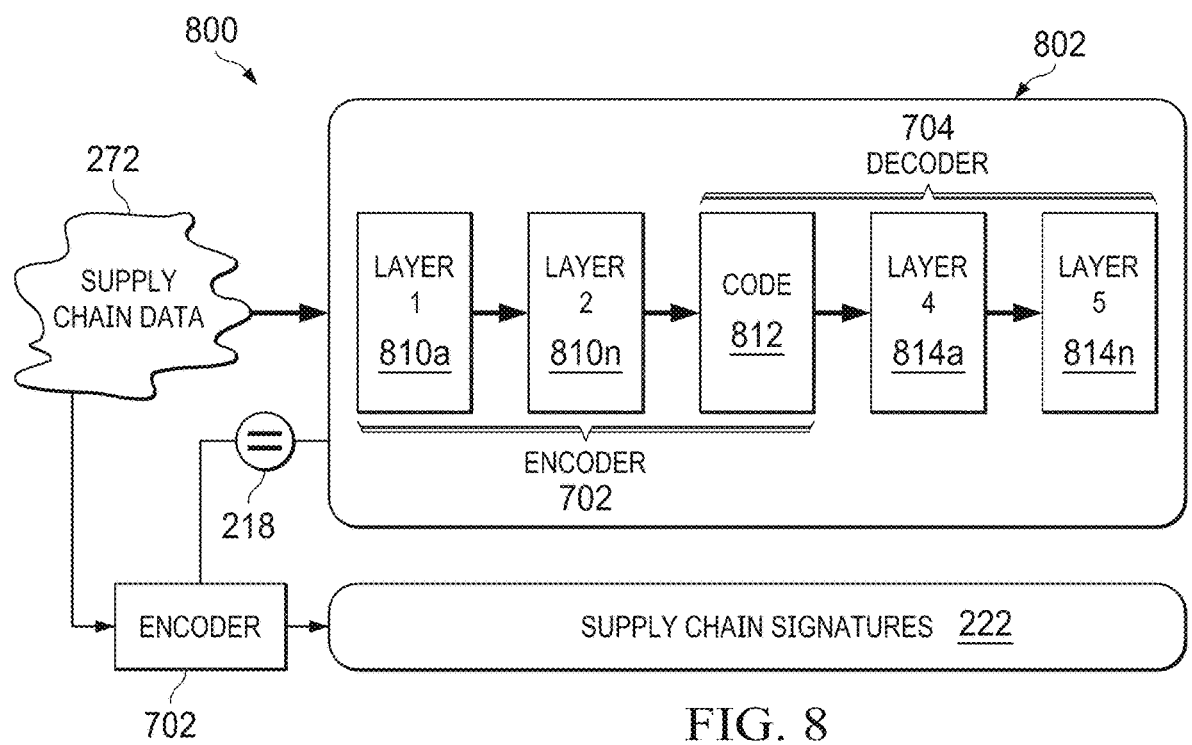
FIG. 8 illustrates a workflow of generating supply chain signatures, in accordance with an embodiment.

FIG. 8 illustrates workflow 800 of generating supply chain signatures 222, in accordance with an embodiment. According to embodiments of workflow 800, supply chain data 262, such as, for example, a supply chain planning problem generated by supply chain planner 130c, is transformed into an image, such as, for example, supply chain network training images 214 and supply chain network sample images 220. In one embodiment, auto-encoder system 110 generates image by converting an integer array generated from binary data received from modeler 282. Multi-layer auto-encoder 802 comprises encoder 702 and decoder 704, as disclosed above. Encoder 702 receives the image, processes the image through one or more input layers 810a-810n while reducing the dimensionality of the image.

Figures 9, 10:
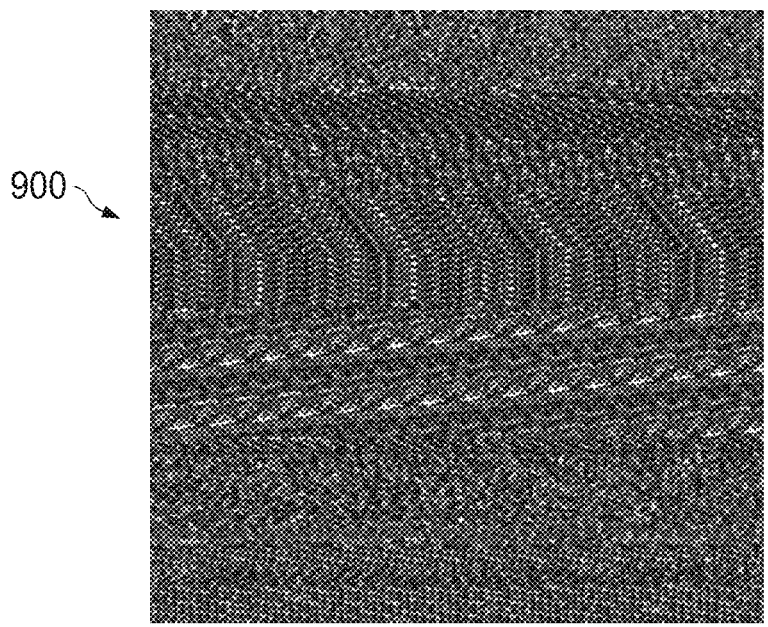
FIG. 9 illustrates an example image of a supply chain network, in accordance with an embodiment.
FIG. 10 illustrates an example array, in accordance with an embodiment.

FIG. 9 illustrates example image 900 of supply chain network 100, in accordance with an embodiment. According to embodiments, auto-encoder system 110 generates an image, such as example image 900, from supply chain network models 210, one or more supply chain planning problems, or data from one or more planning and execution systems 130a-130n received by data processing module 202 of auto-encoder system 110. Data processing module 202 may receive an in-memory object representing the supply chain or supply chain problem, which auto-encoder system 110 converts into a binary, which is ultimately transformed into an image, such as example image 900. As disclosed above, image 900 comprises a converted integer array created from each byte of binary data received from modeler 282. In one embodiment, a supply chain network model, or other data from one or more planning and execution systems is received by a data processing module of auto-encoder system 110. The received data may comprise an in-memory object of the supply chain representation which is converted into a binary and then into an image.

Returning to workflow 800, each layer of input layers 810a-810n learns a different representation of supply chain data 262 from the image. Signature (Code 812) is processed through one or more output layers 814a-814n comprising decoder 704 and transformed into an output image that is acceptably similar to the input image. Input layers 810a-810n of encoder 702 and output layers 814a-814n of decoder 704 are created by a neural-network training method. When the image is processed through the last input layer 810n of encoder 702 (after training), the image is signature (Code) 812. The layers of the trained auto-encoder system may comprise one or more auto-encoder model parameters 216 such as, for example, one or more weights. Using a neural network training technique (such as, for example, a feed forward neural network, a convolution neural network, and the like), auto-encoder system 110 trains multi-layer auto-encoder 802 by adjusting auto-encoder model parameters 216 at each iteration, until auto-encoder model parameters 216 of the trained layers produce an output image from supply chain signature (Code) 812 that recreates the input image encoded by the supply chain signature. Once auto-encoder model parameters 216 are learned, encoder 702 generates a supply chain signature when presented with the image created by transforming the extracted binary of supply chain network models. In one embodiment, a seven-layer auto-encoder receives training data 250 comprising image of supply chain data 262. Auto-encoder system 110 trains the seven-layer auto-encoder to compress and decompress input data with as small an error as possible.

In one embodiment, the training is represented by the following process, where training module 204 of auto-encoder system 110 receives two inputs: a seven-layer auto-encoder, A; and training data, D, comprising the supply chain image converted from binary data. Training module 204 trains the seven-layer auto-encoder, A, to generate the trained seven-layer auto-encoder, A', by compresses and decompresses input data from one or more planning and execution systems 130a-130n by passing images through all layers of multi-layer auto-encoder 802 and observing data differences between input and output layer to error propagate to update all of the auto-encoder model parameters 216 using back propagation. According to one embodiment, training module 204 generates the trained seven-layer auto-encoder, A', according to the following example code:

errorOld=Big number; errorNew=0
While (|errorOld−errorNew|!=0):
error=0
For each image in D:
Pass image through all layers of auto-encoder system and observe input and output layer data difference to error propagate to update all of the auto-encoder model parameters 216 using back propagation.
error=error+difference between input layer and output layer
errorOld=errorNew
errorNew=error
Return trained auto-encoder system 'A'

FIG. 10 illustrates an example array 1000, in accordance with an embodiment. Example array 1000 is a one hundred cell array corresponding to a one-hundred-dimensional vector. As disclosed above, signatures 222 may comprise a one-hundred-dimensional vector, wherein each cell of the array represents one dimension of the vector. By way of example only and not by way of limitation, an input array representing an example supply chain network may comprise an 84,000 dimension vector. As disclosed above, the dimensionality of the 84,000 dimension vector is reduced at each layer of the encoder to a vector having a fewer number of dimensions. For example, a first layer may reduce the 84,000 dimension vector to a 10,000 dimension vector; the second layer may reduce the 10,000 dimension vector to a one-hundred dimension vector. Although supply chain network 100 is described as having a particular number of dimensions at each layer of auto-encoder system 110, embodiments contemplate supply chain network 100 represented by a vector having any suitable number of dimensions, and each layer of the encoder reduces the number of dimensions to any suitable number, according to particular needs.

Figure 11:
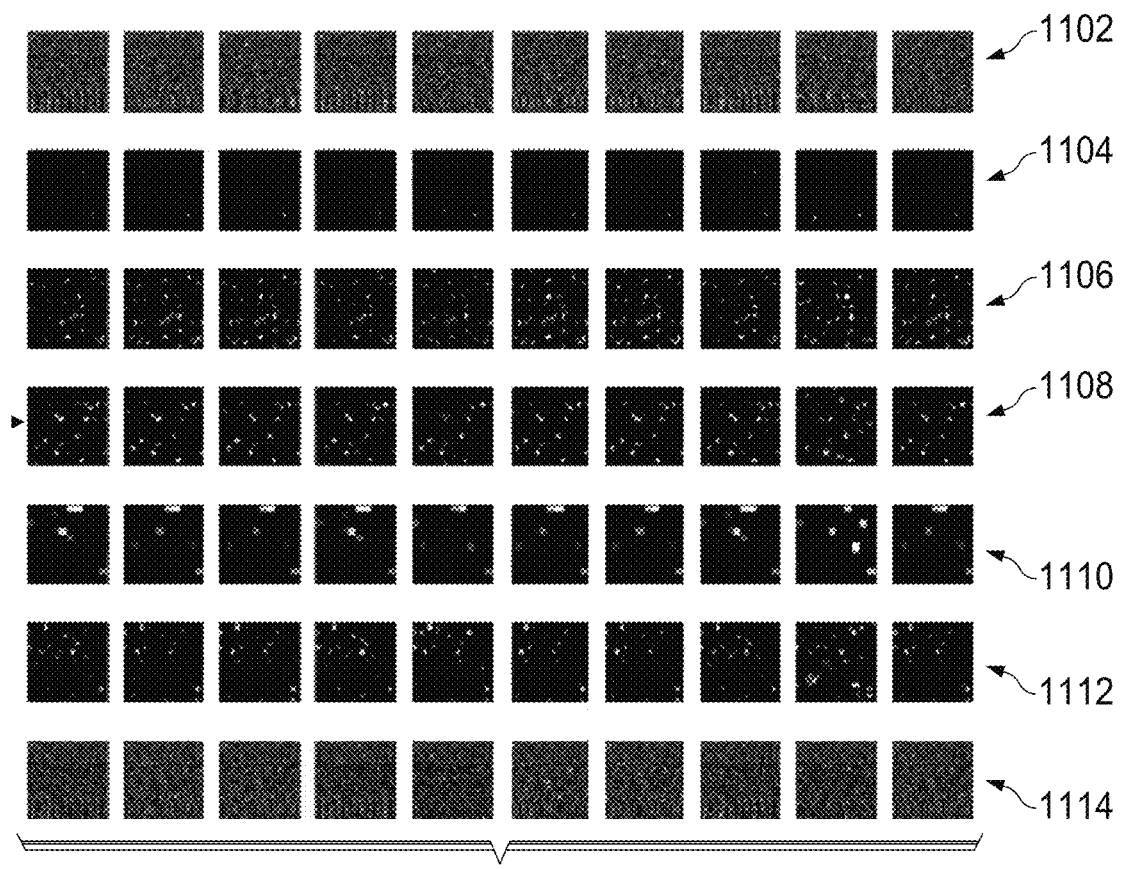
FIG. 11 illustrates visualizations of images of ten exemplary supply chains networks as processed by an example seven-layer auto-encoder system, in accordance with an embodiment.

FIG. 11 illustrates visualizations 1102-1114 of images of ten exemplary supply chains networks as processed by an example seven-layer auto-encoder system, in accordance with an embodiment. As discussed above, auto-encoder model 206 comprises an encoder having one or more layers and a decoder having one or more layers. In one embodiment, auto-encoder system 110 comprises a seven-layer neural network wherein the encoder has three layers, the decoder has three layers, and a layer shared between the encoder and decoder comprises the code representing the supply chain signature. Visualizations of images 1102-1114 represent ten supply chain network models converted to images at each of the seven layers of auto-encoder system 110. Top row visualizations 1102 comprise an input to auto-encoder system 110 and bottom row visualizations 1114 comprise an output of auto-encoder system 110. First layer of the encoder receives the input of first row visualizations 1102 and generates the image of second row visualizations 1104. The second layer of the encoder receive the images of the second row visualizations 1104 and generates the images of third row visualizations 1106. Similarly, these images are received by the third layer and generate the images of the fourth row visualizations 1108. The images of the fourth row represent supply chain signatures 222 for each of the exemplary ten supply chains.

Supply chain signatures 222 represent the output of the encoder and input of the decoder. For the ten exemplary supply chains, the fifth row visualizations 1110 the output generated by the first layer of the decoder in response to processing the supply chain signatures 222. Sixth row visualizations 1112 comprise images is the output of the second layer of the decoder, and the seventh row visualizations 1114 comprise images is the output of the third layer of the decoder. As discussed above, training module 244 trains auto-encoder system 110 by minimizing the differences between the input (top row of images) and the output (bottom row of images) while creating a representational layer that creates supply chain signatures 222 as an image representing a lower-dimensional vector.

Figure 12:
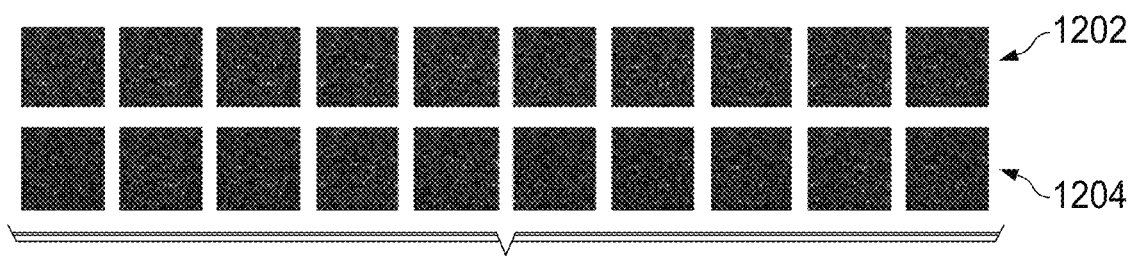
FIG. 12 illustrates visualizations of input images representing a supply chain network and visualizations of output images reconstructed from signatures by an auto-encoder model, in accordance with an embodiment.

FIG. 12 illustrates visualizations 1202 of input images representing a supply chain network and visualizations 1204 of output images reconstructed from signatures 222 by auto-encoder model 206, in accordance with an embodiment. Supply chain visualizations 1202 of the top row comprise supply chain images created from a binary of a supply chain network model, as disclosed above. Visualizations 1204 comprise images reconstructed by the decoder of the trained auto-encoder model from the signature created by the encoder from the input image. As disclosed above, the input and the output are used to train the encoder and decoder of auto-encoder system 110 until the error between the input and the output is below a predetermined threshold, or as low as possible.

FIG. 13 illustrates array 1302 representing the input image of a supply chain network and array 1304 representing the output image reconstructed from the signature by auto-encoder system 110, in accordance with an embodiment. In this example, im1 1302 is the integer array corresponding to the pixels of the input image, and im2 1304 is the integer array corresponding to the pixels of the output image constructed from supply chain signatures 222. When comparing each cell of the array (corresponding to a pixel of the image), the input corresponds with the output. For most pixels, the input value is close to the output value, such that when the input value is low, the output value is low; and, when the input value is high, the output value is high. Although only thirty-six pixels are shown for clarity, the input and output images comprises 84,000 pixels corresponding to an array having 84,000 cells. For this exemplary embodiment, the error calculated was less than 0.1% and the Mean-Squared Error (MSE) was equal to 9.41.

In other words, the one-hundred dimensional signature represents the 84,000 dimensions of the input image, and closely reproduced this input when decoded. As shown by the example array 1000 of FIG. 10, many of the dimensions comprise zero. Only a small number of non-zero numbers are required to represent a supply chain network as a one-hundred dimensional vector that may then be used as an input of various AI-based methods, as described herein.

Figure 15:
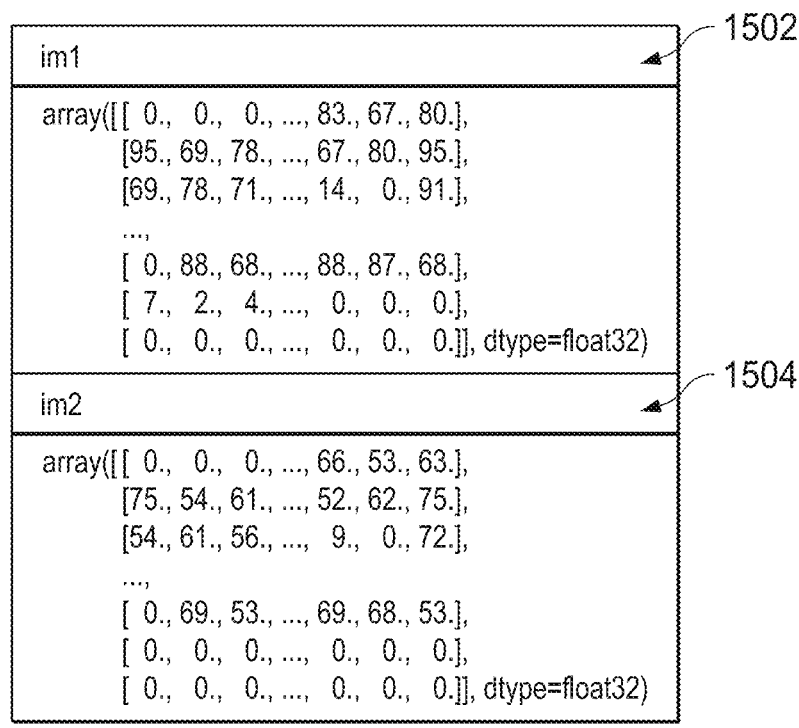
FIG. 15 illustrates an array representing the input image of a supply chain network and an array representing the output image for a third use case, in accordance with an embodiment.

Additional examples comparing arrays corresponding to input and output images of the trained auto-encoder model are provided in FIGS. 14-15.

FIG. 14 illustrates array 1402 representing the input image of a supply chain network and array 1404 representing the output image for a second use case, in accordance with an embodiment. Although example signature is described as comparing a one-hundred dimensional array, embodiments contemplate an array having any number of dimensions, according to particular needs.

FIG. 15 illustrates array 1502 representing the input image of a supply chain network and array 1504 representing the output image for a third use case, in accordance with an embodiment. In one embodiment, groupings of differently-sized supply chains (supply chain size is number of nodes like materials, capacities and operations in the supply chain) are fit to particular dimensions. By way of example only and not by way of limitation, an exemplary sizing policy may sort small supply chain into 50-dimensional space, mid-sized supply chains to 100-dimensional space, and large supply chains (e.g. over 5000 nodes) may have 200-dimensional space vectors. Although the supply chains are described as comprising three sized assigned to particular number of dimensional space vectors, embodiments contemplate any number of groupings, or no groupings, having any number of dimensions that give a useful auto-encoder model, according to particular needs. Importantly, the dimensionally may be configured while training the auto-encoder model. Additional exemplary use cases of auto-encoder model 206 are provided below.

Warehousing

By way of example only and not by way of limitation, auto-encoder system 110 may receive raw binary data from warehouse management system 130b of one or more distribution centers, manufacturer, retailers, suppliers, or the like. The received data may comprise item information, item images, shelf location, pricing, shelving sizes, locations, heights, shelf locations, inventory levels, packaging and shipping constraints, packing instructions, and other like data. Embodiments contemplate combining warehouse management system 130b with data received from one or more other supply chain planning and executions systems 130a-130n, according to particular needs. As described above in connection with supply chain data 262, auto-encoder system 110 may train a neural network model to construct one or more layers that reduce the dimensionality of the input data by calculating a difference between an input image and an output image, the images representing warehouse management system 130b. In addition, warehouse management system 130b may generate an item-location combination matrix. According to one embodiment, the item location combination matrix has a first dimension representing locations for storing items in the warehouse, a second dimension representing particular items, and the element at each intersection comprises a 1 if the particular item is present at the corresponding warehouse location, or a 0 if the item is not at the location. When the input comprises an item-location combination matrix, the matrix may be converted directly to an image by the auto-encoder, as described above.

Similarly, embodiments contemplate auto-encoder system 110 generating supply chain signatures 222 for the item-location combination of a retail store, wherein each element of an item-location matrix may represent the presence or absence of an item at each stocking location (such as, for example, a store shelf space represented by a planogram).

Transportation

By way of a second example only and not by limitation, auto-encoder system 110 may receive raw binary data from transportation network 130a of supply chain network 100. The received data may comprise mapping data, routing data (such as, for example, routes, addresses, delivery instructions, and the like), package identification information, item information, and the like, and other like data. Embodiments contemplate combining the planogram planning data with data received from one or more other supply chain planning and executions systems, according to particular needs. As described above, auto-encoder system 110 may train a neural network model to construct one or more layers that reduce the dimensionality of the input data by calculating a difference between an input digital image and an output digital image, the digital images representing transportation data 260. In addition, as described in connection with warehouse management system 130b, transportation network 130a may be modeled as an item-location combination matrix. In an embodiment representing transportation network 130a, the first dimension comprises each particular transportation route, the second dimension represents particular items, wherein an element has a value of 1 when the item is present on a transportation route, and a value of 0, when it is not.

Planograms

By way of a third example only and not by limitation, auto-encoder system 110 may receive raw binary data from a planogram planner of one or more retailers of one or more supply chain entities 150. The received data may comprise item information, item images, shelf location, pricing, shelving sizes, locations, heights, shelf locations, and the like, and other like data. Embodiments contemplate combining the planogram planning data with data received from one or more other supply chain planning and executions systems 130a-130n, according to particular needs. As described above in connection with supply chain data 262, auto-encoder system 110 may train a neural network model to construct one or more layers that reduce the dimensionality of the input data by calculating a difference between an input digital image and an output digital image, the digital images representing the planogram planning data. Embodiments additionally contemplate auto-encoder system 110 generates signatures 222 for an item location combination matrix for a retail location, such as, for example a store shelf space represented by a planogram. The item location combination matrix may comprise a location dimension corresponding to each possible item placement on a planogram and the item location corresponds to the particular items that are stocked by the retailer, and each element is a 1, if the item is present at the location, and a 0, if it is not present.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method for automated machine learning supply chain planning, comprising:
    receiving, by a computer comprising a processor and a memory, a first supply chain network model comprising one or more material constraints for operations of a first supply chain network;
    transforming, by the computer, the first supply chain network model expressed as an integer array into a digital image;
    training, by the computer, an auto-encoder model to reduce a dimensionality of an input vector corresponding to the digital image by iteratively adjusting weights of one or more layers of the auto-encoder model using a back propagation of error until the auto-encoder model reconstructs the digital image from a supply chain signature; and
    locating, by the computer, one or more items in the first supply chain network based at least in part on an item location combination matrix.

2. The computer-implemented method of claim 1, further comprising:
    receiving, by the computer, a second supply chain data model, the second supply chain data model comprising one or more material constraints for operations of a second supply chain network; and
    calculating, by the computer, a difference between the first supply chain network and the second supply chain network by comparing the supply chain signature of the first supply chain network with a supply chain signature of the second supply chain network using a t-Distributed Stochastic Neighbor Embedding method.

3. The computer-implemented method of claim 1, wherein the supply chain signature comprises a vector space model having a lower dimensionality than the digital image, the vector space model indicating dynamic data and structure of one or more supply chain components.

4. The computer-implemented method of claim 1, wherein one or more supply chain components comprises one or more of:
    the one or more material constraints;
    one or more capacity constraints;
    lead times;
    yield rates;
    inventory levels;
    safety stock; and
    demand dates.

5. The computer-implemented method of claim 1, wherein the supply chain signature comprises one or more transportation routes of a transportation network.

6. The computer-implemented method of claim 1, wherein the supply chain signature comprises stocking locations of one or more warehouses.

7. The computer-implemented method of claim 1, wherein the supply chain signature comprises a Hilbert space.

8. A system of automated machine learning supply chain planning, comprising:
    a computer, comprising a processor and memory, the computer configured to:
        receive a first supply chain network model comprising one or more material constraints for operations of a first supply chain network;
        transform the first supply chain network model expressed as an integer array into a digital image;
        train an auto-encoder model to reduce a dimensionality of an input vector corresponding to the digital image by iteratively adjusting weights of one or more layers of the auto-encoder model using a back propagation of error until the auto-encoder model reconstructs the digital image from a supply chain signature; and
        locate one or more items in the first supply chain network based at least in part on an item location combination matrix.

9. The system of claim 8, wherein the computer is further configured to:
    receive a second supply chain data model, the second supply chain data model comprising one or more material constraints for operations of a second supply chain network; and
    calculate a difference between the first supply chain network and the second supply chain network by comparing the supply chain signature of the first supply chain network with a supply chain signature of the second supply chain network using a t-Distributed Stochastic Neighbor Embedding method.

10. The system of claim 8, wherein the supply chain signature comprises a vector space model having a lower dimensionality than the digital image, the vector space model indicating dynamic data and structure of one or more supply chain components.

11. The system of claim 8, wherein one or more supply chain components comprises one or more of:
    the one or more material constraints;
    one or more capacity constraints;

lead times;
yield rates;
inventory levels;
safety stock; and
demand dates.

12. The system of claim 8, wherein the supply chain signature comprises one or more transportation routes of a transportation network.

13. The system of claim 8, wherein the supply chain signature comprises stocking locations of one or more warehouses.

14. The system of claim 8, wherein the supply chain signature comprises a Hilbert space.

15. A non-transitory computer-readable medium embodied with software, the software when executed:
receives a first supply chain network model comprising one or more material constraints for operations of a first supply chain network;
transforms the first supply chain network model expressed as an integer array into a digital image;
trains an auto-encoder model to reduce a dimensionality of an input vector corresponding to the digital image by iteratively adjusting weights of one or more layers of the auto-encoder model using a back propagation of error until the auto-encoder model reconstructs the digital image from a supply chain signature; and
locates one or more items in the first supply chain network based at least in part on an item location combination matrix.

16. The non-transitory computer-readable medium of claim 15, wherein the software when executed further:
receives a second supply chain data model, the second supply chain data model comprising one or more material constraints for operations of a second supply chain network; and
calculates a difference between the first supply chain network and the second supply chain network by comparing the supply chain signature of the first supply chain network with a supply chain signature of the second supply chain network using a t-Distributed Stochastic Neighbor Embedding method.

17. The non-transitory computer-readable medium of claim 15, wherein the supply chain signature comprises a vector space model having a lower dimensionality than the digital image, the vector space model indicating dynamic data and structure of one or more supply chain components.

18. The non-transitory computer-readable medium of claim 15, wherein one or more supply chain components comprises one or more of:
the one or more material constraints;
one or more capacity constraints;
lead times;
yield rates;
inventory levels;
safety stock; and
demand dates.

19. The non-transitory computer-readable medium of claim 15, wherein the supply chain signature comprises one or more transportation routes of a transportation network.

20. The non-transitory computer-readable medium of claim 15, wherein the supply chain signature comprises stocking locations of one or more warehouses.

* * * * *